US010230275B2

(12) United States Patent
Noguchi et al.

(10) Patent No.: US 10,230,275 B2
(45) Date of Patent: Mar. 12, 2019

(54) POWER SUPPLY DEVICE, AND CONTROL METHOD OF POWER SUPPLY DEVICE

(71) Applicant: Renesas Electronics Corporation, Tokyo (JP)

(72) Inventors: Koichiro Noguchi, Tokyo (JP); Koichi Nose, Tokyo (JP); Yoshifumi Ikenaga, Tokyo (JP); Yoichi Yoshida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 15/826,062

(22) Filed: Nov. 29, 2017

(65) Prior Publication Data

US 2018/0083494 A1 Mar. 22, 2018

Related U.S. Application Data

(63) Continuation of application No. 14/690,381, filed on Apr. 18, 2015, now Pat. No. 9,843,227.

(30) Foreign Application Priority Data

Apr. 25, 2014 (JP) .................................. 2014-090922

(51) Int. Cl.
*H02J 1/10* (2006.01)
*H02J 50/20* (2016.01)
(Continued)

(52) U.S. Cl.
CPC .............. *H02J 50/20* (2016.02); *H02J 1/102* (2013.01); *H02J 7/025* (2013.01); *H02J 17/00* (2013.01); *H02J 50/40* (2016.02)

(58) Field of Classification Search
CPC ................................... H02J 17/00; H02J 1/102
(Continued)

(56) References Cited

U.S. PATENT DOCUMENTS 9,843,227 B2 * 12/2017 Noguchi ................. H02J 1/102
2005/0068009 A1 3/2005 Aoki
(Continued)

FOREIGN PATENT DOCUMENTS

JP 08-079970 A 3/1996
JP 2011-030324 A 2/2011

OTHER PUBLICATIONS

United States Notice of Allowance dated Sep. 11, 2017 in U.S. Appl. No. 14/690,381.
(Continued)

*Primary Examiner* — Thomas Skibinski
(74) *Attorney, Agent, or Firm* — McGinn I.P. Law Group, PLLC

(57) ABSTRACT

A power supply device includes a plurality of power sources each including an antenna and an AC/DC conversion unit that converts an AC signal received by the antenna to a DC signal, a plurality of consolidating units each including a first consolidating circuit that selectively consolidates a plurality of DC signals supplied by the plurality of power sources, and a power supply unit that includes a second consolidating circuit that selectively consolidates DC signals output from the plurality of consolidating units, and a first voltage conversion circuit that converts a DC signal resulting from consolidation in the second consolidating circuit, to a predetermined voltage.

17 Claims, 18 Drawing Sheets

(51) Int. Cl.
*H02J 7/02* (2016.01)
*H02J 50/40* (2016.01)
*H02J 17/00* (2006.01)

(58) Field of Classification Search
USPC .................................................. 307/52, 104
See application file for complete search history.

(56) References Cited

U.S. PATENT DOCUMENTS

| | | |
|---|---|---|
| 2008/0210762 A1 | 9/2008 | Osada |
| 2009/0044026 A1 | 2/2009 | Li |
| 2012/0187767 A1 | 7/2012 | Kanno |

OTHER PUBLICATIONS

United States Non-Final Rejection dated Jun. 7, 2017 in U.S. Appl. No. 14/690,381.

\* cited by examiner

POWER SUPPLY DEVICE, AND CONTROL METHOD OF POWER SUPPLY DEVICE

CROSS-REFERENCE TO RELATED APPLICATIONS

The present application is a Continuation Application of U.S. patent application Ser. No. 14/690,381, filed on Apr. 18, 2015, which is based on Japanese patent application No. 2014-090922, filed on Apr. 25, 2014, the disclosure of which is incorporated herein in its entirety by reference.

BACKGROUND

The present invention relates to a power supply device and to a control method of a power supply device, for instance a power supply device that converts radio waves to power, and a method for controlling such a power supply device.

Energy harvesting technologies in which radio waves in the surroundings (environmental radio waves) are converted to power have garnered attention in recent years. By resorting to energy harvesting technologies, it becomes possible to dispense with the need for installing batteries in electronic devices, and to improve thus the convenience of electronic devices.

Herein, Japanese Unexamined Patent Application Publication No. H08-79970 discloses a technology pertaining to a device provided with a plurality of power sources, wherein power is supplied simultaneously from each power source to each load, without incurring element malfunction, breakdown or the like. Further, Japanese Unexamined Patent Application Publication No. 2011-30324 discloses a technology pertaining to a power supply device that combines multiple power supply units, the power supply device having high reliability in that the probability that each system malfunctions at the same time is reduced, and there is no instantaneous interruption of power supply.

SUMMARY

A power supply device that converts surrounding radio waves to power includes a plurality of power sources each including an antenna and an AC/DC conversion unit that converts, to a DC signal, the AC signal received by the antenna. The DC signals supplied by the plurality of power sources are consolidated in the power supply unit, and a DC signal resulting from consolidation is converted to a predetermined voltage using a voltage conversion circuit. Since the power obtained from one power source is small in energy harvesting technologies where radio waves in the surroundings are converted to power, such technologies involve arranging a plurality of power sources, collecting then, in a power supply unit, the power obtained in the plurality of power sources, and converting thereupon the power to a predetermined voltage using a voltage conversion circuit.

In a power supply device comprising a plurality of power sources and a power supply unit, however, each power source must be connected with the power supply unit using wiring. Accordingly, wiring that connects each power source with the power supply unit is disposed over the entirety of the power supply device, which translates into a greater wiring length in the power supply device. The greater the wiring length in the power supply device, the higher becomes the likelihood that wiring itself functions as an antenna, which has thus an impact on the characteristics of the antennas provided in each power source. A problem arises as a result in that antenna characteristics are impaired and the power obtained from each antenna decreases, and in consequence, the power obtained from the power supply device as a whole decreases likewise.

Other issues and novel features will become apparent on the basis of the disclosure in the description below and accompanying drawings.

In a power supply device according to an embodiment, a plurality of AC signals received by a plurality of antennas undergoes AC/DC conversion to generate a plurality of DC signals, the plurality of DC signals undergoes selective consolidation using first consolidating circuits, a plurality of DC signals output from the first consolidating circuits undergoes selective consolidation using a second consolidating circuit, and a DC signal resulting from consolidation in the second consolidating circuit is converted to a predetermined voltage using a first voltage conversion circuit.

By virtue of the above embodiment, it becomes possible to provide a power supply device in which wiring length can be curtailed, and in which drops in power obtained in the power supply device as a whole can be likewise curtailed, and to provide a control method of such a power supply device.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiment 1

Figure 1:
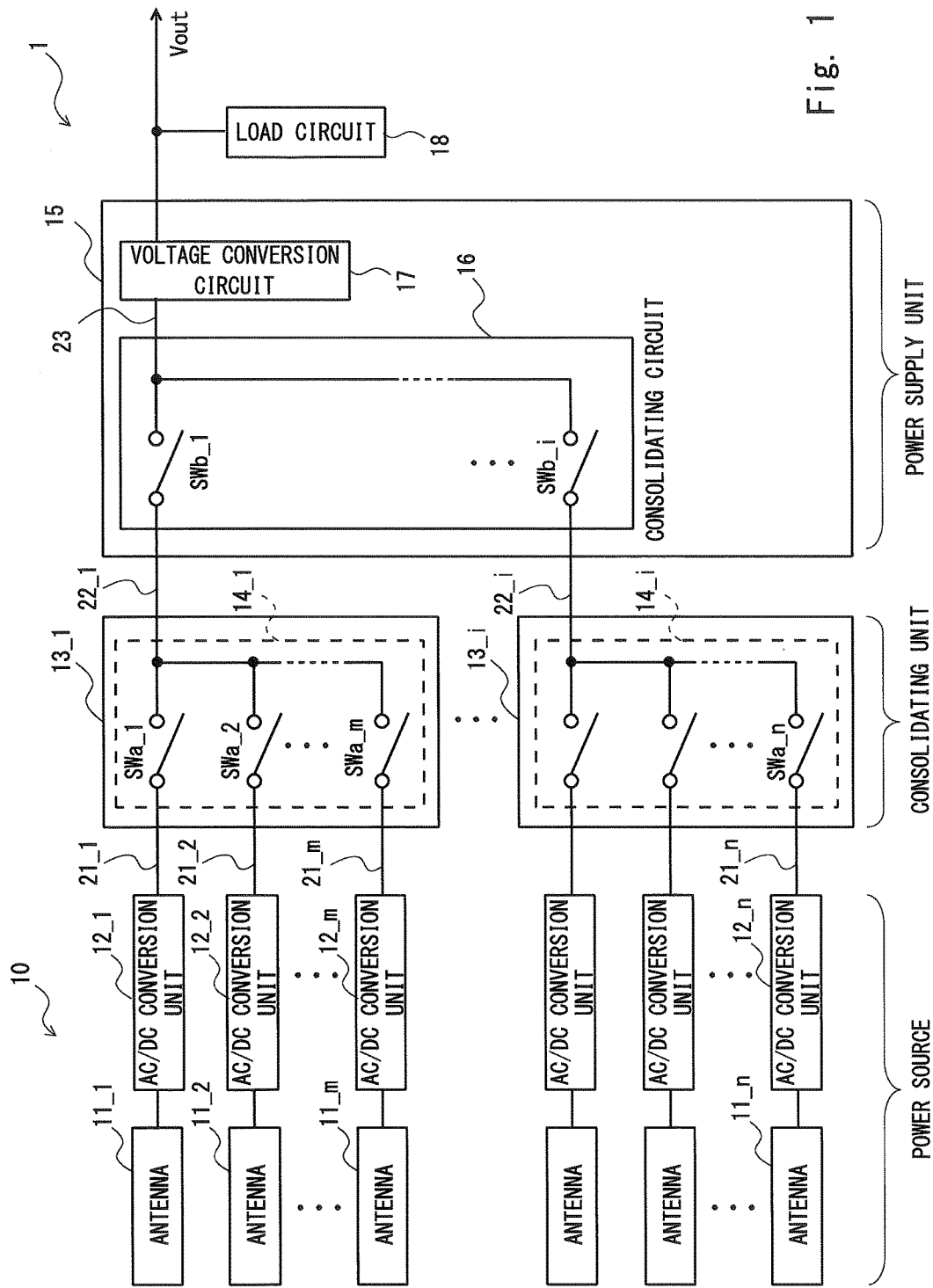
FIG. 1 is a block diagram illustrating a power supply device according to Embodiment 1.

Embodiment 1 will be explained next with reference to accompanying drawings. FIG. 1 is a block diagram illustrating a power supply device 1 according to Embodiment 1. As illustrated in FIG. 1, the power supply device 1 according to the present embodiment includes a plurality of antennas 11_1 to 11_n, a plurality of AC/DC conversion units 12_1 to 12_n, a plurality of consolidating units 13_1 to 13_i, and a power supply unit 15. Each antenna 11_1 to 11_n and each AC/DC conversion unit 12_1 to 12_n make up each respective power source 10. Specifically, FIG. 1 illustrates an instance where there are provided n power sources 10. An output Vout of the power supply device 1 is supplied to a load circuit 18.

The antennas 11_1 to 11_n receive radio waves of a predetermined frequency band, and output the received signals (i.e. AC signals) to respective AC/DC conversion units 12_1 to 12_n. The antennas 11_1 to 11_n are configured to be capable of receiving radio waves of a frequency band (i.e. high-energy frequency band) that is often used in the environment where the power supply device 1 is installed. For instance, the antennas 11_1 to 11_n are configured to be capable of receiving radio waves in frequency bands of mobile phones, radio waves in frequency bands of wireless LAN, and radio waves in frequency bands of terrestrial digital broadcasting.

The antennas 11_1 to 11_n may be configured to receive radio waves of a single frequency band, or to receive radio waves of a plurality of frequency bands. In a case where the antennas 11_1 to 11_n are configured to receive radio waves of a plurality of frequency bands, the antennas may be configured in such a manner that for instance a plurality of antennas 11_1 to 11_m corresponding to one consolidating unit 13_1 receives radio waves of a plurality of frequency bands. In other words, the antennas may be configured in such a manner that a signal based on radio waves of a plurality of frequency bands is supplied to one consolidating unit 13_1.

For instance, antennas 11_1 to 11_m corresponding to one consolidating unit 13_1 may be configured so as to receive radio waves of a single frequency band, while a plurality of antennas corresponding to another consolidating unit 13_2 may be configured to receive radio waves of a single frequency band (different from that of the antennas 11_1 to 11_m).

In FIG. 1, m denotes the number of antennas corresponding to the consolidating unit 13_1, and n denotes the total number of antennas provided in the power supply device 1. The number of antennas corresponding to each consolidating unit 13_1 to 13_i may be identical or different. In order to simplify the explanation hereafter, instances will be described in which the number of antennas corresponding to each consolidating unit 13_1 to 13_i is identical (m antennas). In such a case, specifically, the total number of antennas is n=m×i (where i is the number of consolidating units 13_1 to 13_i).

The AC/DC conversion units 12_1 to 12_n, which are provided so as to correspond to the antennas 11_1 to 11_n, convert the AC signals received by the antennas 11_1 to 11_n to respective DC signals, and output DC signals 21_1 to 21_n after conversion to the consolidating units 13_1 to 13_i.

The plurality of consolidating units 13_1 to 13_i has input thereinto the plurality of DC signals 21_1 to 21_n supplied by the plurality of power sources 10 (AC/DC conversion units 12_1 to 12_n), and selectively consolidates the input plurality of DC signals 21_1 to 21_n. Each consolidating unit 13_1 to 13_i includes a respective consolidating circuit 14_1 to 14_i (first consolidating circuits). The consolidating circuit 14_1 includes switches SWa_1 to SWa_m provided so as to correspond to the AC/DC conversion units 12_1 to 12_m. Each switch SWa_1 to SWa_m is configured to be capable of switching the connection between each AC/DC conversion unit 12_1 to 12_m and an output node 22_1 of the consolidating unit 13_1.

Specifically, one end of the switch SWa_1 is connected to the output side of the AC/DC conversion unit 12_1, while the other end of the switch SWa_1 is connected to the output node 22_1 of the consolidating unit 13_1. When the switch SWa_1 is in an on state, the output side of the AC/DC conversion unit 12_1 and the output node 22_1 of the consolidating unit 13_1 are connected, and a DC signal 21_1 is supplied to the output node 22_1. When the switch SWa_1 is in an off state, on the other hand, the output side of the AC/DC conversion unit 12_1 and the output node 22_1 of the consolidating unit 13_1 are disconnected. In such a case, no DC signal 21_1 is supplied to the output node 22_1 of the consolidating unit 13_1. The other switches SWa_2 to SWa_m are identical to the switch SWa_1.

In a case where, for instance, the voltage of the DC signal 21_1 that is supplied by the AC/DC conversion unit 12_1 is equal to or greater than a predetermined threshold value, the consolidating circuit 14_1 brings the switch SWa_1 to an on state, to connect thereby the output side of the AC/DC conversion unit 12_1 and the output node 22_1 of the consolidating unit 13_1, such that the DC signal 21_1 is supplied to the output node 22_1. In a case where, on the other hand, the voltage of the DC signal 21_1 that is supplied by the AC/DC conversion unit 12_1 is smaller than a predetermined threshold value, the consolidating circuit 14_1 brings the switch SWa_1 to an off state, to disconnect thereby the output side of the AC/DC conversion unit 12_1 from the output node 22_1 of the consolidating unit 13_1.

By controlling thus the switches SWa_1 to SWa_m, the consolidating circuit 14_1 allows consolidating selectively a plurality of DC signals 21_1 to 21_m, supplied by the AC/DC conversion units 12_1 to 12_m, and outputting a consolidated DC signal to the output node 22_1. In other words, the consolidating circuit 14_1 allows outputting, to the output node 22_1, only those DC signals 21_1 to 21_m having a voltage that is equal to or greater than predetermined threshold value.

In a case where, for instance, the output side of all the AC/DC conversion units 12_1 to 12_m is connected to the output node 22_1, those AC/DC conversion units that are connected to antennas that receive strong radio waves and AC/DC conversion units that are connected to antennas that receive weak radio waves are connected to the output node 22_1. In other words, high-output voltage signals of AC/DC conversion units that are connected to antennas that receive strong radio waves, and low-output voltage signals of AC/DC conversion units that are connected to antennas that receive weak radio waves, are connected to the output node 22.

In such a case, leakage current to ground potential flows ordinarily, in the AC/DC conversion units, in proportion to the output voltage of the AC/DC conversion units. Upon connection, to a high voltage, of the output of AC/DC conversion units that are connected to antennas that receive weak radio waves, a leakage current that is larger than the power obtained from the antenna flows therefore to the AC/DC conversion units, and loss of power is incurred as a result.

In consequence, although obtaining the total sum of power output from the AC/DC conversion units would be the ideal situation, in actuality there can be obtained only power that is smaller, due to the above problem of leakage current, than the power that would be obtained from a single AC/DC conversion unit connected to the antennas that receive strong radio waves.

From the viewpoint of usability of the system as a whole, on the other hand, it would be preferable to use AC/DC conversion units that operate at a high conversion efficiency, also with weak radio waves. However, the greater the number of AC/DC conversion units that operate at a high conversion efficiency, also with weak radio waves, the more decreases the threshold value of the elements that make up the AC/DC conversion unit, and the larger becomes the leakage current. The above problem of leakage current becomes accordingly more pronounced as there increases the number of AC/DC conversion units intended for recovery of very weak radio waves.

In a case where, for instance, radio waves received by the antenna 11_1 are strong, and the radio waves received by the antenna 11_2 are weak (or in a case where no radio waves are received), the voltage of the DC signal 21_1 that is output from the AC/DC conversion unit 12_1 is large, and the voltage of the DC signal 21_2 output from the AC/DC conversion unit 12_2 is small (or zero). In this case, when the AC/DC conversion unit 12_1 and the AC/DC conversion unit 12_2 are connected to the output node 22_1, leakage current flows from the AC/DC conversion unit 12_1 to the AC/DC conversion unit 12_2, and the power obtained from the output node 22_1 decreases.

In the present embodiment, therefore, the AC/DC conversion units 12_1 to 12_m corresponding to the antennas 11_1 to 11_m of weak received radio waves, from among the antennas 11_1 to 11_m, are disconnected from the output node 22_1. It becomes accordingly possible to curtail drops in the power that is obtained from the output node 22_1.

The configuration of the other consolidating units 13_2 to 13_i (consolidating circuits 14_2 to 14_i) is identical to that of the consolidating unit 13_1 (consolidating circuit 14_1).

The power supply unit 15 includes a consolidating circuit 16 (second consolidating circuit) and a voltage conversion circuit 17 (first voltage conversion circuit). The consolidating circuit 16 has input thereinto the DC signals (hereafter referred to as DC signals 22_1 to 22_i) output from the respective output nodes 22_1 to 22_i of each consolidating unit 13_1 to 13_i, and selectively consolidates the input plurality of DC signals 22_1 to 22_i. The consolidating circuit 16 includes switches SWb_1 to SWb_i provided so as to correspond to the output nodes 22_1 to 22_i. Each switch SWb_1 to SWb_i is configured to be capable of switching the connection between each output node 22_1 to 22_i and an output node 23 of the consolidating circuit 16. The configuration of the consolidating circuit 16 is basically identical to that of the consolidating circuit 14_1 provided in the consolidating unit 13_1 explained above.

In a case where, for instance, the voltage of the DC signal 22_1 supplied by the consolidating unit 13_1 is equal to or greater than predetermined threshold value, the consolidating circuit 16 brings the switch SWb_1 to an on state, whereby the DC signal 22_1 is output to the output node 23. On the other hand, when the voltage of the DC signal 22_1 that is supplied by the consolidating unit 13_1 is smaller than a predetermined threshold value, the consolidating circuit 16 brings the switch SWb_1 to an off state, whereby no DC signal 22_1 is supplied to the output node 23. The DC signals 22_1 to 22_i supplied to the consolidating circuit 16 are DC signals after resulting from consolidation in the consolidating circuits 14_1 to 14_i. Accordingly, the predetermined threshold value that serves as the criterion for switching on/off by the consolidating circuit 16 takes on a value higher than the predetermined threshold value that serves as the criterion for switching on/off by the consolidating circuits 14_1 to 14_i.

By controlling thus the switches SWb_1 to SWb_m, the consolidating circuit 16 allows consolidating selectively the DC signals 22_1 to 22_i supplied by the consolidating units 13_1 to 13_i, and outputting a consolidated DC signal to the output node 23. In other words, the consolidating circuit 16 allows outputting, to the output node 23, only those DC signals 22_1 to 22_i having a voltage equal to or greater than a predetermined threshold value.

In a case where, for instance, the DC signal 22_1 supplied by the consolidating unit 13_1 is a signal into which there are consolidated radio waves received by ten antennas, and the DC signal 22_2 supplied by the consolidating unit 13_2 is a signal into which there are consolidated radio waves received by two antennas, then the voltage of the DC signal 22_1 is significantly larger than the voltage of the DC signal 22_2. When the consolidating unit 13_1 and the consolidating unit 13_2 are connected to the output node 23 in this case, leakage current flows from the consolidating unit 13_1 to the consolidating unit 13_2, and the power obtained from the output node 23 decreases.

In the present embodiment, therefore, DC signals of low voltage, from among the DC signals 22_1 to 22_i supplied by the consolidating units 13_1 to 13_i, are disconnected from the output node 23, to curtail thereby drops in the power obtained from the output node 23.

The voltage conversion circuit 17 converts the voltage of the DC signal resulting from consolidation in the consolidating circuit 16 (DC signal of the output node 23, hereafter referred to as DC signal 23). For instance, the voltage conversion circuit 17 boosts the DC signal 23 to a predetermined voltage, and outputs a boosted output voltage Vout to the load circuit 18.

Figure 2:
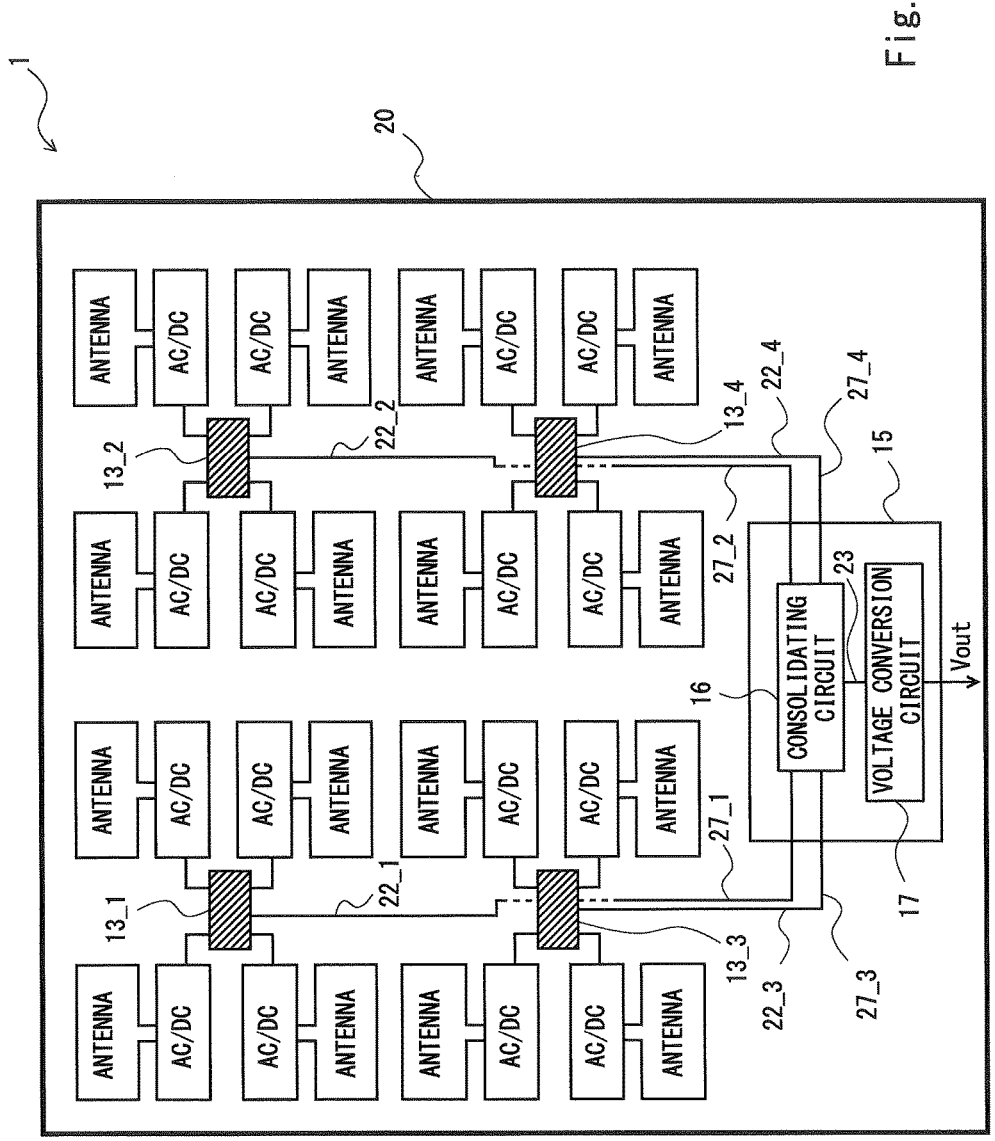
FIG. 2 is a top-view diagram illustrating a configuration example of a power supply device according to Embodiment 1.

FIG. 2 is a top-view diagram illustrating a configuration example of the power supply device 1 according to the present embodiment. FIG. 2 illustrates an example of the power supply device 1 provided with sixteen antennas, sixteen AC/DC conversion units, and four consolidating unit 13_1 to 13_4, on a substrate 20.

The consolidating unit 13_1 consolidates the DC signals output from four power sources (antennas and AC/DC conversion units), and outputs the consolidated DC signal 22_1 to the consolidating circuit 16 of the power supply unit 15, via wiring 27_1. The consolidating unit 13_2 consolidates the DC signals output from four power sources, and outputs a consolidated DC signal 22_2 to the consolidating circuit 16 of the power supply unit 15, via wiring 27_2. The consolidating unit 13_3 consolidates the DC signals output from four power sources, and outputs a consolidated DC signal 22_3 to the consolidating circuit 16 of the power supply unit 15, via wiring 27_3. The consolidating unit 13_4 consolidates the DC signals output from four power sources, and outputs a consolidated DC signal 22_4 to the consolidating circuit 16 of the power supply unit 15, via wiring 27_4.

In the power supply device 1 according to the present embodiment, thus DC signals output from a predetermined number of power sources are consolidated in the consolidating units 13_1 to 13_4, and the consolidated DC signals 22_1 to 22_4 are supplied to the power supply unit 15. It becomes accordingly possible to curtail the length of wiring in the power supply device.

Figure 3:
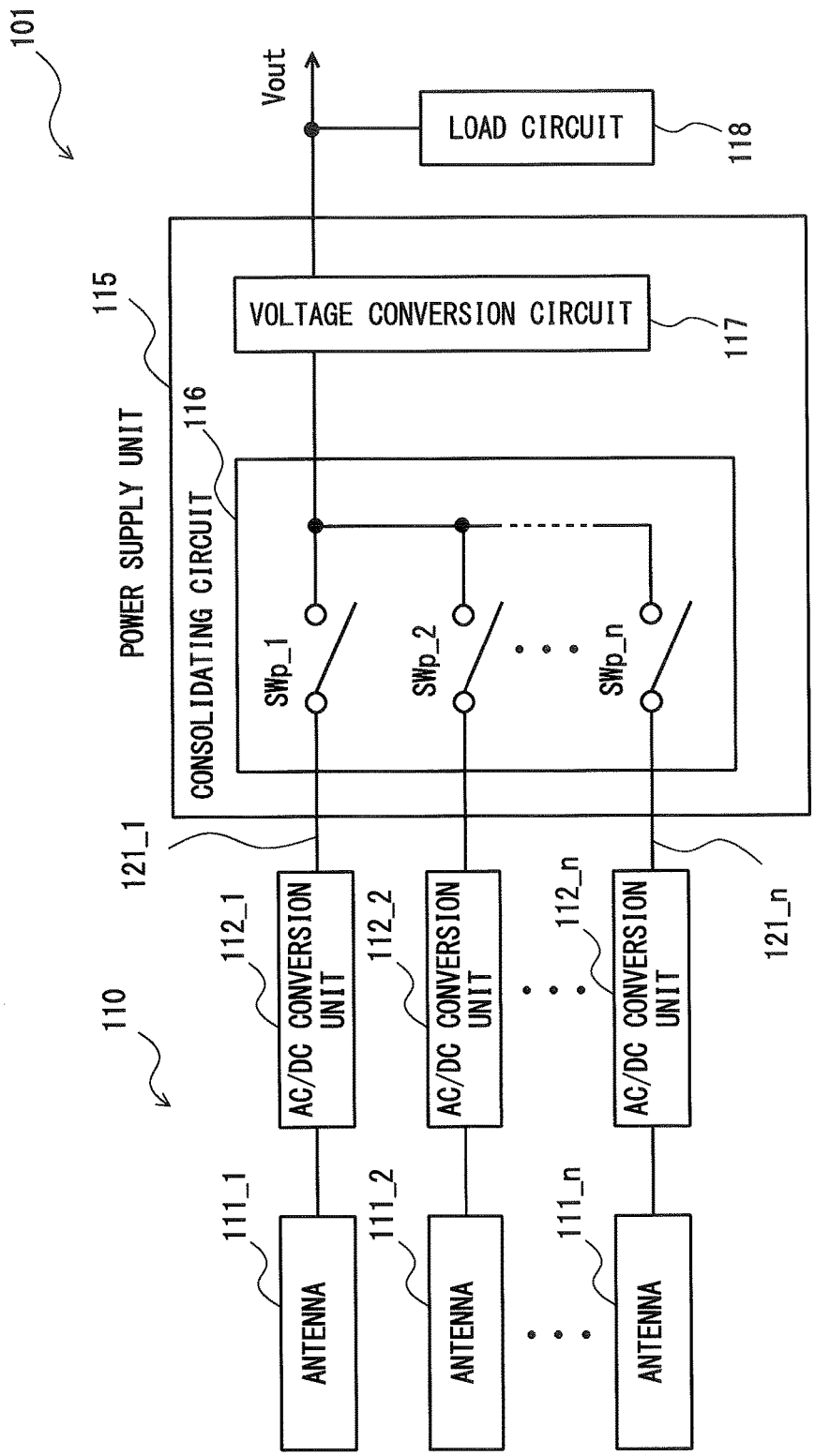
FIG. 3 is a block diagram illustrating a power supply device according to a comparative example.

FIG. 3 is a block diagram illustrating a power supply device 101 in a comparative example. As illustrated in FIG. 3, the power supply device 101 according to the comparative example includes a plurality of antennas 111_1 to 111_$n$, a plurality of AC/DC conversion units 112_1 to 112_$n$ and a power supply unit 115. The antennas 111_1 to 111_$n$ and the AC/DC conversion units 112_1 to 112_$n$ make up power sources 110. An output Vout of the power supply device 101 is supplied to a load circuit 118. The power supply unit 115 includes a consolidating circuit 116 and a voltage conversion circuit 117.

The power supply device 101 according to the comparative example illustrated in FIG. 3 differs from the power supply device 1 illustrated in FIG. 1 in that the power supply device 101 lacks the consolidating units 13_1 to 13_$i$. Otherwise, the power supply device 101 is identical to that of the power supply device 1 illustrated in FIG. 1, and hence recurrent features will not be explained again. In the power supply device 101 according to the comparative example illustrated in FIG. 3, those constituent elements corresponding to the power supply device 1 illustrated in FIG. 1 are denoted by respective 100-series reference symbols.

Figure 4:
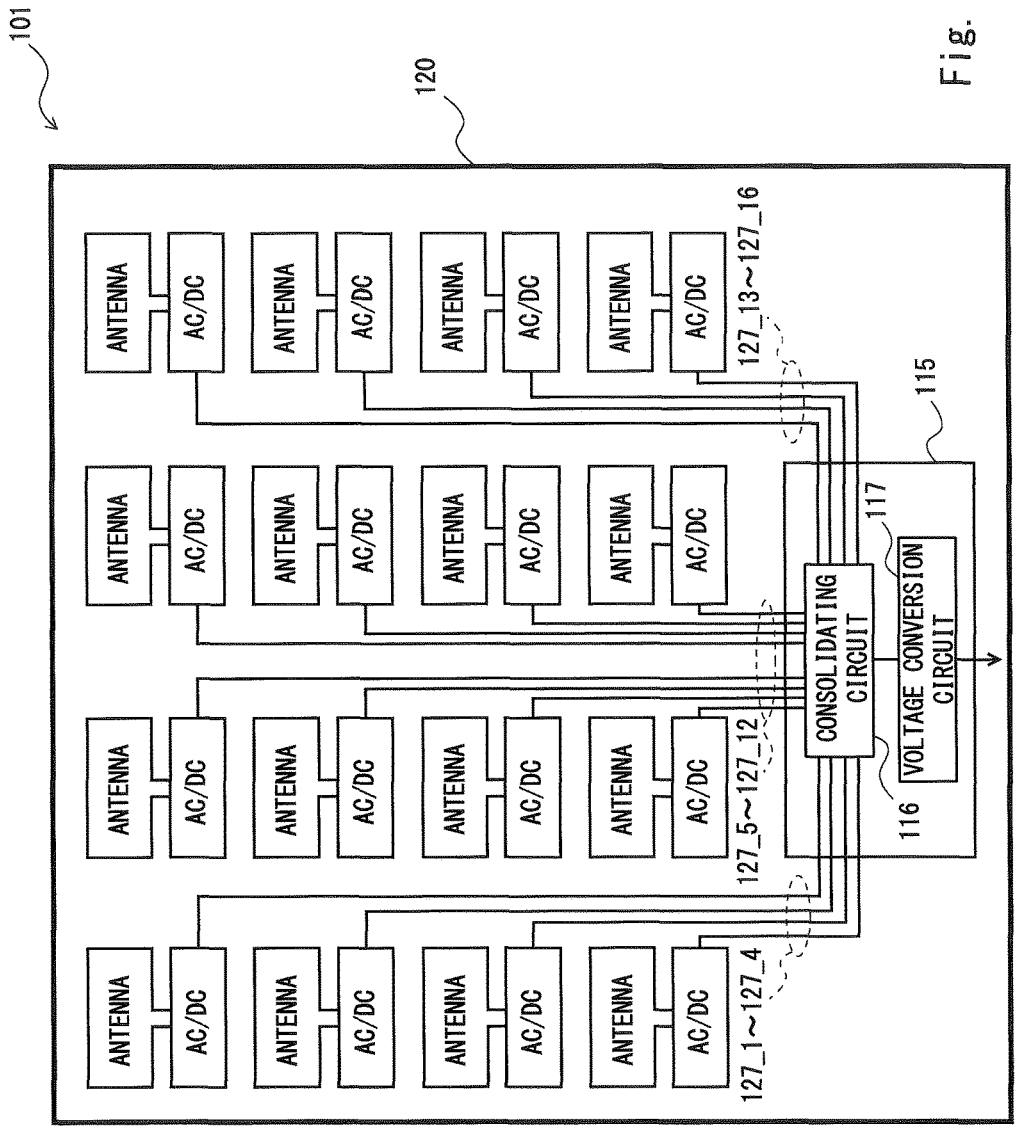
FIG. 4 is a top-view diagram illustrating a power supply device according to the comparative example.

FIG. 4 is a top-view diagram illustrating the power supply device 101 according to the comparative example. In FIG. 4, an example of the power supply device 101 is illustrated wherein the latter includes sixteen antennas and sixteen AC/DC conversion units, on a substrate 120. In the power supply device 101 according to the comparative example, the DC signal output from each power source (antenna and AC/DC conversion unit) is output directly to the consolidating circuit 116 of the power supply unit 115, via wiring 127_1 to 127_16. In the power supply device 101 according to the comparative example, wiring length is thus greater, since each AC/DC conversion unit and the consolidating circuit 116 of the power supply unit 115 must be directly connected via the wiring 127_1 to 127_16.

When the plurality of AC/DC conversion units and the consolidating circuit 116 of the power supply unit 115 are connected using the wiring 127_1 to 127_16, the wiring that connects each power source with the power supply unit is disposed over the entirety of the power supply device, and thus the wiring length of the power supply device increases. The greater the wiring length in the power supply device, the higher becomes the likelihood that wiring itself functions as an antenna, which has thus an impact on the characteristics of the antennas provided in each power source. A problem arises as a result in that antenna characteristics are impaired and the power obtained from each antenna decreases, and in consequence, the power obtained from the power supply device as a whole decreases likewise.

In the power supply device 1 according to the present embodiment, therefore, the DC signals that are output from a predetermined number of power sources (sixteen in the case of FIG. 2) are consolidated in the consolidating units 13_1 to 13_4, and the consolidated DC signals 22_1 to 22_4 are supplied to the power supply unit 15. It becomes accordingly possible to curtail the length of wiring in the power supply device, and, therefore, to suppress drops in the power that is obtained in the power supply device as a whole.

In the present embodiment, each consolidating unit 13_1 to 13_4 and the power supply unit 15 may be configured using semiconductor chips. As illustrated in FIG. 2, for instance, a plurality of power sources (antennas and AC/DC conversion units), a plurality of consolidating chips (consolidating units) 13_1 to 13_4 and a power source chip (power supply unit) 15 may be disposed on a substrate.

The effect of the power supply device 1 according to the present embodiment will be explained next with reference to a specific example.

In the configuration (comparative example) illustrated in FIG. 3, for instance, the total wiring length is n×L1, where n is the total number of antennas, and L1 is the wiring distance (average value of wiring distance) between the AC/DC conversion units 112_1 to 112_$n$ and the power supply unit 115.

In the configuration (embodiment) illustrated in FIG. 1, meanwhile, the total number of antennas is set to n, the number of antennas connected to one consolidating unit 13_1 to 13_$i$ is set to m, the wiring distance (average value of wiring distance) between the consolidating units 13_1 to 13_$i$ and the power supply unit 15 is set to L1, and the wiring distance (average value of wiring distance) between the AC/DC conversion units 12_1 to 12_$n$ and the consolidating units 13_1 to 13_$i$ is set to L2. In the configuration illustrated in FIG. 1, the consolidating units 13_1 to 13_$i$ are disposed close to the AC/DC conversion units 12_1 to 12_$n$. It is assumed herein that the positions at which the consolidating units 13_1 to 13_$i$ are disposed are any positions on the substrate, and, accordingly, L1 in the configuration (comparative example) illustrated in FIG. 3 and L1 in the configuration (embodiment) illustrated in FIG. 1 are envisaged to be comparable wiring lengths.

In the configuration illustrated in FIG. 1, accordingly, the total wiring length between the AC/DC conversion units 12_1 to 12_$n$ and the consolidating units 13_1 to 13_$i$ is n×L2, and the total wiring length between the consolidating units 13_1 to 13_$i$ and the power supply unit 15 is (n/m)×L1 (where n/m=i). Therefore, the total wiring length in the configuration illustrated in FIG. 1 is n×L2+(n/m)×L1.

An example will be explained next of an instance where the size of the substrates 20, 120 is set to a 50-cm square. In the configuration illustrated in FIG. 3 (comparative example), n=16 and L1=25 cm (average wiring length of wiring of all the antennas), and the total wiring length is 400 cm.

In the configuration (embodiment) illustrated in FIG. 1, by contrast, n=16, L1=25 cm, m=4 and L2=2 cm, the total wiring length between the AC/DC conversion units 12_1 to 12_16 and the consolidating units 13_1 to 13_4 is 28 cm, and the total wiring length between the consolidating units 13_1 to 13_4 and the power supply unit 15 is 100 cm. Therefore, the total wiring length in the configuration illustrated in FIG. 1 is 128 cm.

In the case of the configuration (embodiment) illustrated in FIG. 1, accordingly, the total wiring length is reduced by 68% with respect to that in the configuration (comparative example) illustrated in FIG. 3.

Embodiment 2

Figure 5:
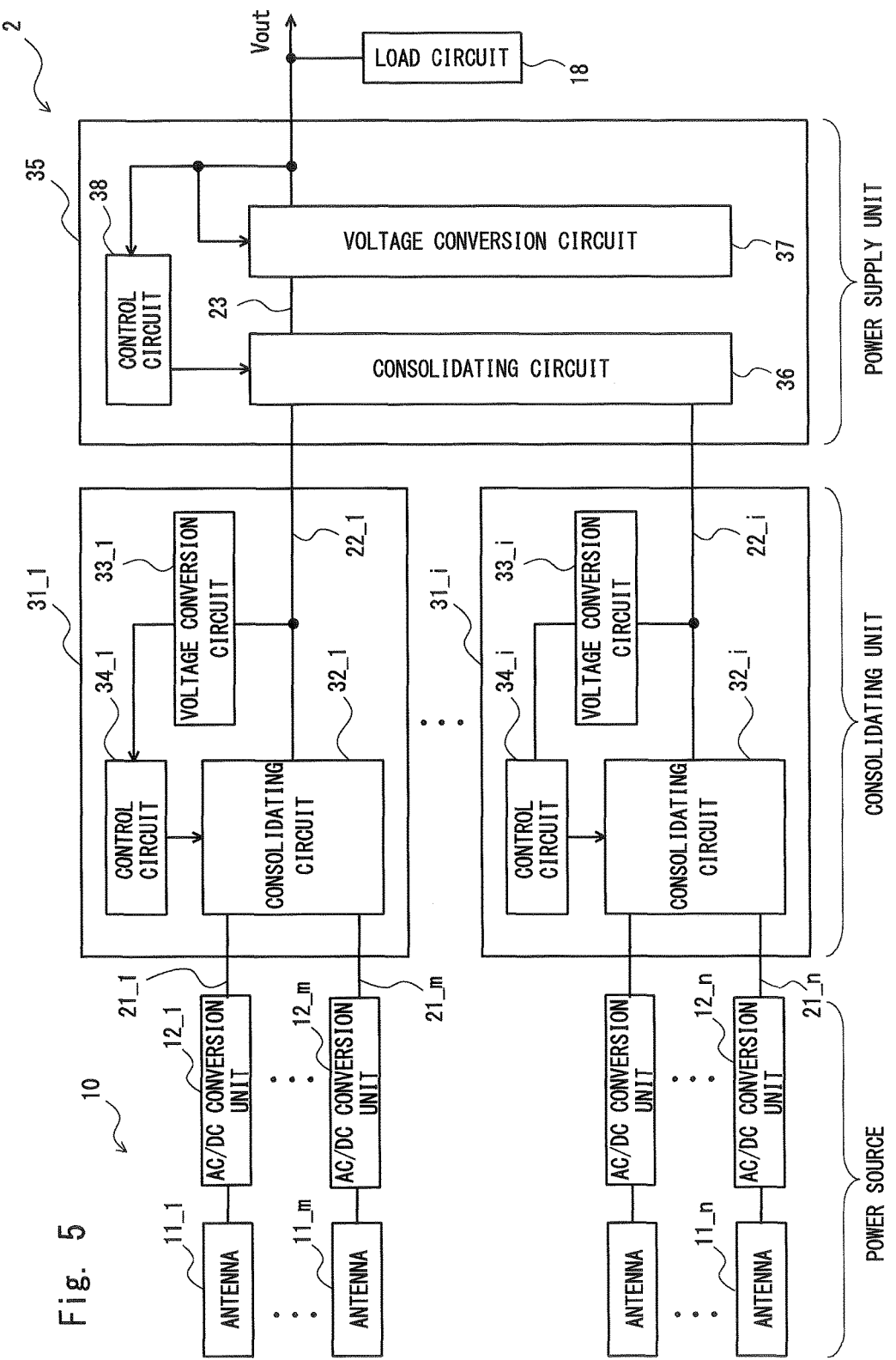
FIG. 5 is a block diagram illustrating a power supply device according to Embodiment 2.

Embodiment 2 will be explained next. FIG. 5 is a block diagram illustrating a power supply device 2 according to Embodiment 2. In the present embodiment there is illustrated a more concrete configuration example of the power supply device explained in Embodiment 1. Those constituent elements in the power supply device 2, illustrated in FIG. 5, that are identical to those of the power supply device 1 according to Embodiment 1 illustrated in FIG. 1 will be denoted with identical reference symbols, and will not be explained anew.

As illustrated in FIG. 5, the power supply device 2 according to the present embodiment includes a plurality of antennas 11_1 to 11_n, a plurality of AC/DC conversion units 12_1 to 12_n, a plurality of consolidating units 31_1 to 31_i and a power supply unit 35. The antennas 11_1 to 11_n are identical to those of in the instance explained in Embodiment 1.

Figure 6:
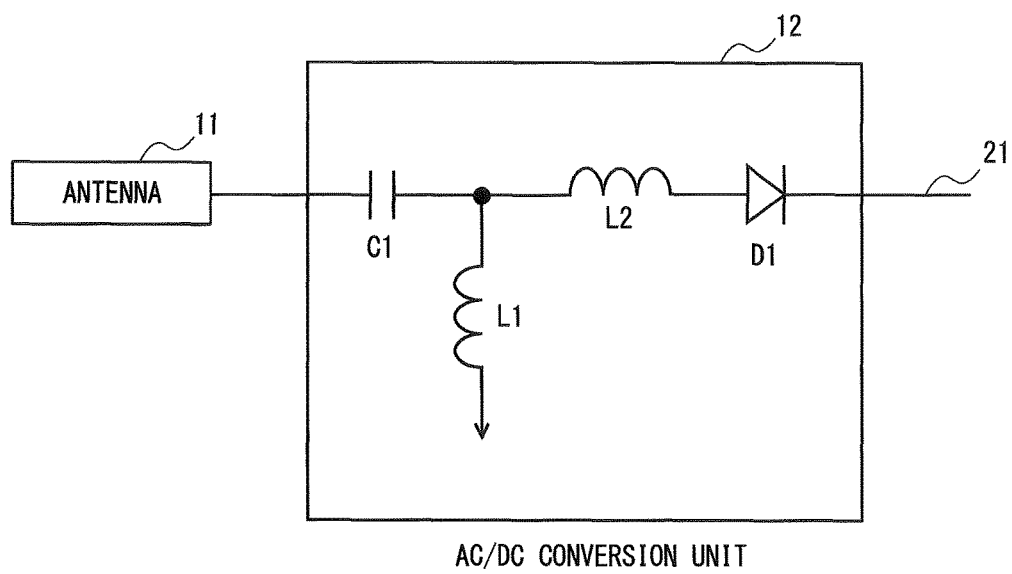
FIG. 6 is a circuit diagram illustrating an example of an AC/DC conversion unit provided in a power supply device according to Embodiment 2.

FIG. 6 is a circuit diagram illustrating an example of the AC/DC conversion units 12 (hereafter, the AC/DC conversion units 12_1 to 12_n will be referred to collectively as AC/DC conversion unit 12. The same applies to other constituent elements). As illustrated in FIG. 6, the AC/DC conversion unit 12 includes a capacitor C1, inductors L1, L2, and a diode D1. One end of the capacitor C1 is connected to an antenna 11, and the other end is connected to one end of the inductor L1 and one end of the inductor L2. The other end of the inductor L1 is connected to ground potential. The other end of the inductor L2 is connected to the anode of the diode D1. The cathode of the diode D1 is connected to a consolidating circuit 32. That is, the DC signal 21 is output from the cathode of the diode D1. The AC/DC conversion unit 12 is configured thus in the form of a T-type matching circuit and half-wave rectifier circuit, such that an input AC signal is converted to a DC signal.

The AC/DC conversion unit 12 illustrated in FIG. 6 is an example. The AC/DC conversion unit 12 in the present embodiment may adopt some other configuration.

As illustrated in FIG. 5, the consolidating units 31_1 to 31_i include respective consolidating circuits 32_1 to 32_i, voltage conversion circuits 33_1 to 33_i (second voltage conversion circuits) and control circuits 34_1 to 34_i (first control circuits). The consolidating circuits 32_1 to 32_i have input thereinto the DC signals 21_1 to 21_n that are supplied by the AC/DC conversion units 12_1 to 12_n, and selectively consolidate the input DC signals 21_1 to 21_n. The consolidating circuits 32_1 to 32_i have the same configuration as that of the consolidating circuits 14_1 to 14_i illustrated in FIG. 1. Each voltage conversion circuit 33_1 to 33_i converts the voltage of the DC signals 22_1 to 22_i resulting from consolidation in each respective consolidating circuit 32_1 to 32_i. Each control circuit 34_1 to 34_i respectively controls each consolidating circuit 32_1 to 32_i. Power is supplied by each voltage conversion circuit 33_1 to 33_i to each control circuit 34_1 to 34_i.

Figure 7:
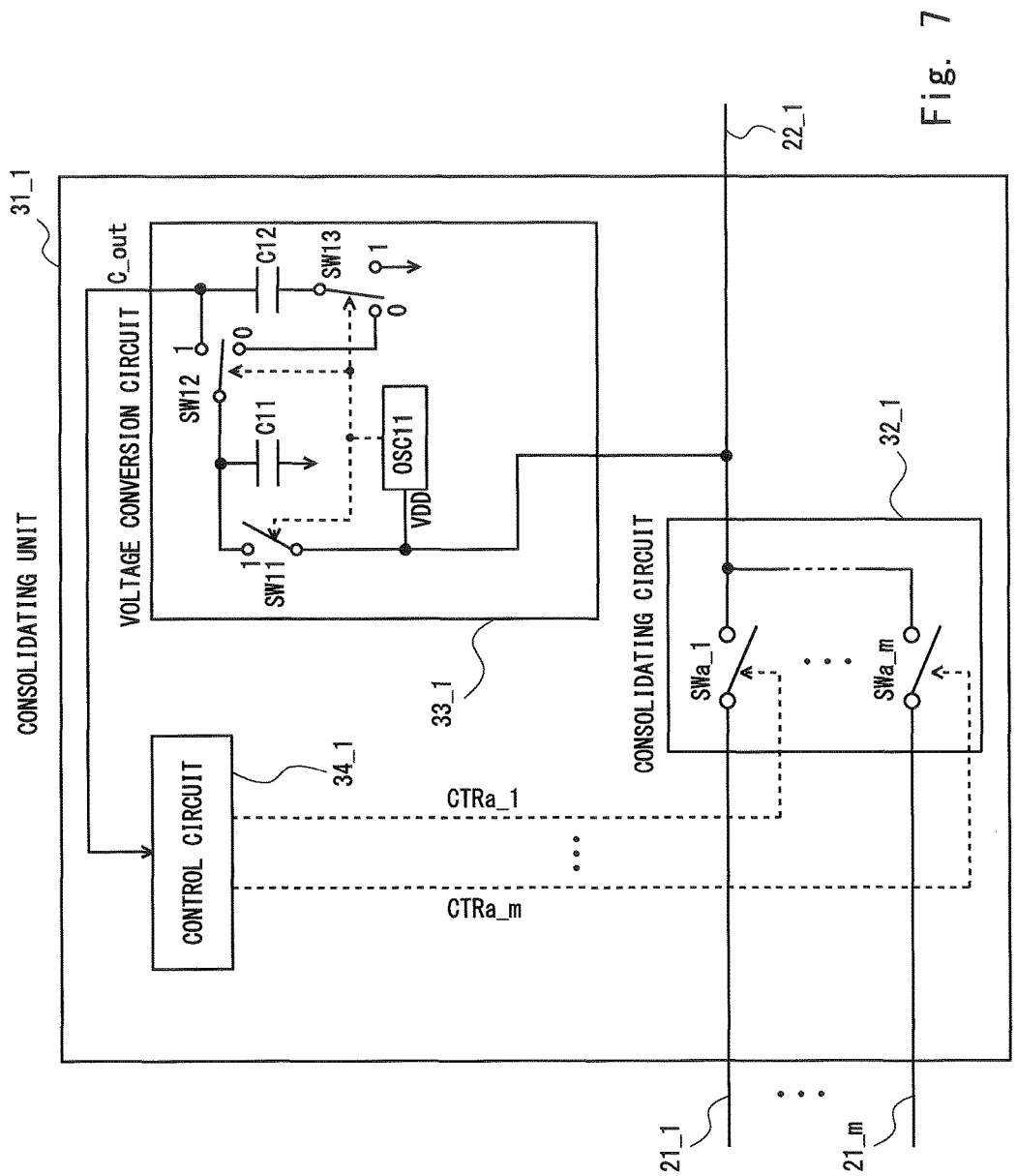
FIG. 7 is a circuit diagram illustrating an example of a consolidating unit provided in a power supply device according to Embodiment 2.

FIG. 7 is a circuit diagram illustrating an example of the consolidating unit 31_1 provided in the power supply device 2 according to the present embodiment. As illustrated in FIG. 7, the consolidating circuit 32_1 includes switches SWa_1 to SWa_m. Each switch SWa_1 to SWa_m is configured to be capable of switching the respective connection between each AC/DC conversion unit 12_1 to 12_m and the output node 22_1. The switches SWa_1 to SWa_m are controlled using control signals CTRa_1 to CTRa_m output from the control circuit 34_1.

In a case where, for instance, the voltage of the DC signal 21_1 supplied by the AC/DC conversion unit 12_1 is equal to or greater than a predetermined threshold value, the control circuit 34_1 brings the switch SWa_1 to an on state, whereby the DC signal 21_1 is output to the output node 22_1. In a case where, on the other hand, the voltage of the DC signal 21_1 that is supplied by the AC/DC conversion unit 12_1 is smaller than a predetermined threshold value, the control circuit 34_1 brings the switch SWa_1 to an off state, to disconnect thereby the output side of the AC/DC conversion unit 12_1 and the output node 22_1. The same applies to the other switches SWa_2 to SWa_m.

The voltage conversion circuit 33_1 converts the DC signal 22_1, resulting from consolidation in the consolidating circuit 32_1 to 32_i, to a predetermined voltage. In the example illustrated in FIG. 7 a configuration is depicted in which the voltage conversion circuit 33_1 is configured in the form of a switched capacitor.

As illustrated in FIG. 7, the voltage conversion circuit 33_1 includes switches SW11 to SW13, capacitors C11, C12, and an oscillator circuit OSC11. The switch SW11 switches between connection and non-connection of the output node 22_1 and one end of the capacitor C11. The other end of the capacitor C11 is connected to ground potential. The switch SW12 switches between connection ("0") of the one end of the capacitor C11 and the switch SW13, and connection ("1") of the one end of the capacitor C11 and one end of the capacitor C12. The switch SW13 switches between connection ("0") of the switch SW12 and the other end of the capacitor C12, and connection ("1") of the other end of the capacitor C12 and ground potential. The oscillator circuit OSC11 supplies a control clock signal to each switch SW11 to SW13.

The switch SW11 is brought to an on state (connection state) when the clock signal output from the oscillator circuit OSC11 takes on a high level ("1"). Thereupon, the one end of the capacitor C11 and the one end of the capacitor C12 are connected by the switch SW12, and the other end of the capacitor C12 is connected to ground potential by the switch SW13. Accordingly, the capacitor C11 and the capacitor C12 are brought to a state of being connected in parallel, such that the capacitor C11 and the capacitor C12 are charged by the DC signal 22_1.

Thereafter, the switch SW11 is brought to an off state (non-connection state) when the clock signal output from the oscillator circuit OSC11 takes on a low level ("0"). Thereupon, the one end of the capacitor C11 and the other end of the capacitor C12 are connected by the switch SW12 and the switch SW13. Accordingly, the capacitor C11 and the capacitor C12 are brought to a state of being connected in series, and boosted voltage is output from an output node C_out of the voltage conversion circuit 33_1. The voltage conversion circuit 33_1 converts the DC signal 22_1 to predetermined voltage by repeating such an operation. The output (predetermined power source voltage) of the voltage conversion circuit 33_1 is supplied to the control circuit 34_1.

The power supply unit 35 illustrated in FIG. 5 includes a consolidating circuit 36, a voltage conversion circuit 37 (first voltage conversion circuit) and a control circuit 38 (second control circuit). The consolidating circuit 36 has input thereinto the DC signals 22_1 to 22_i respectively output from each consolidating unit 31_1 to 31_i, and selectively consolidates the input DC signals 22_1 to 22_i. The consolidating circuit 36 has the same configuration as that of the consolidating circuit 16 illustrated in FIG. 1. The voltage conversion circuit 37 converts the voltage of the DC signal 23 resulting from consolidation in the consolidating circuit 36. The control circuit 38 controls the consolidating circuit 36. Power from the voltage conversion circuit 37 is supplied to the control circuit 38.

Figure 8:
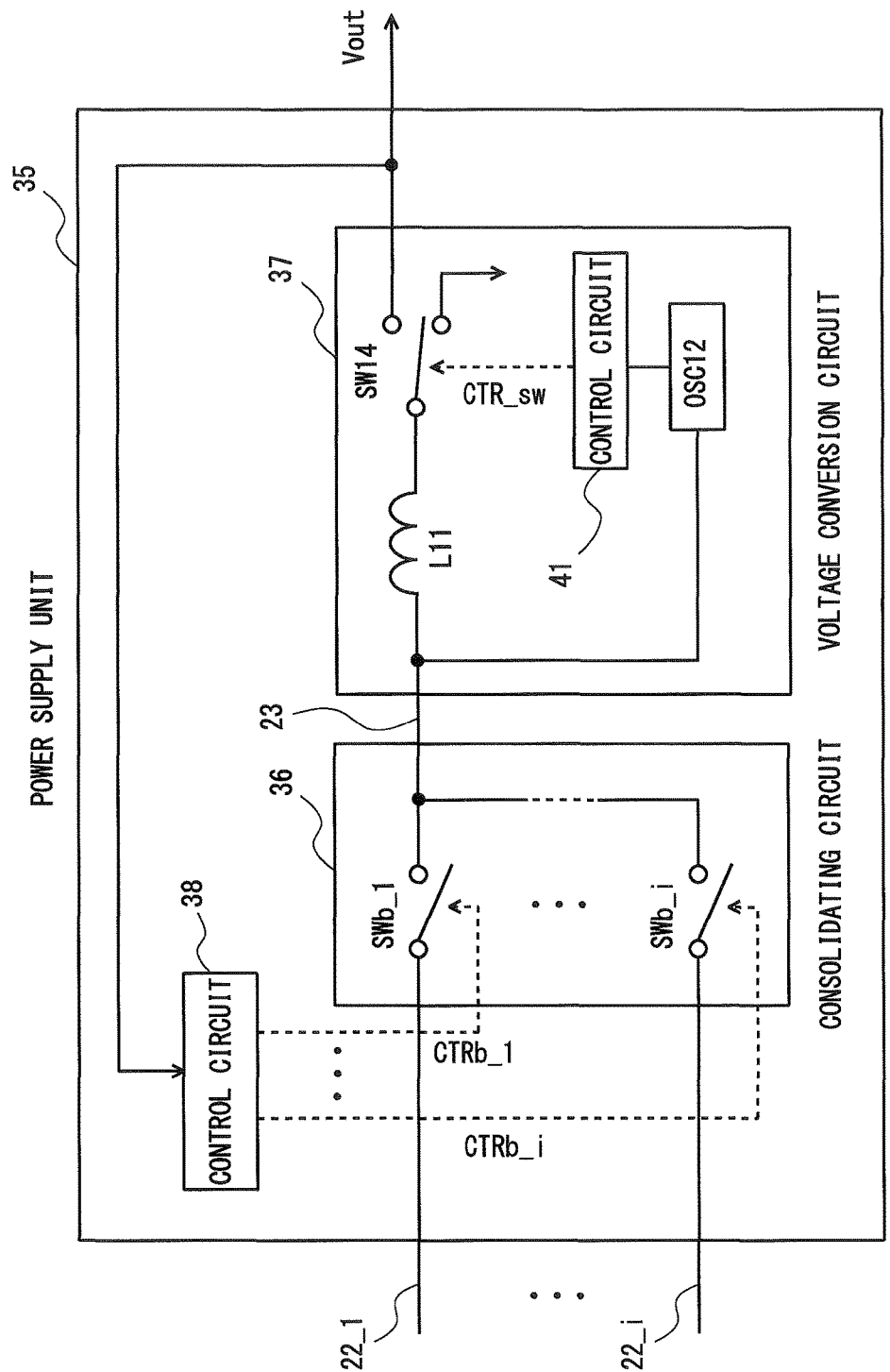
FIG. 8 is a circuit diagram illustrating an example of a power supply unit provided in a power supply device according to Embodiment 2.

FIG. 8 is a circuit diagram illustrating an example of the power supply unit 35 provided in the power supply device 2 according to the present embodiment. As illustrated in FIG. 8, the consolidating circuit 36 includes the switches SWb_1 to SWb_i. Each switch SWb_1 to SWb_i is configured to be capable of switching the connection of the respective output nodes 22_1 to 22_i of each consolidating unit 31_1 to 31_i and the output node 23 of the consolidating circuit 36. The switches SWb_1 to SWb_i are controlled using control signals CTRb_1 to CTRb_i that are output from the control circuit 38.

In a case where, for instance, the voltage of the DC signal 22_1 supplied by the consolidating unit 13_1 is equal to or greater than predetermined threshold value, the control circuit 38 brings the switch SWb_1 to an on state, whereby the DC signal 22_1 is output to the output node 23. On the other hand, when the voltage of the DC signal 22_1 that is supplied by the consolidating unit 13_1 is smaller than a predetermined threshold value, the control circuit 38 brings the switch SWb_1 to an off state, whereby no DC signal 22_1 is supplied to the output node 23. The same applies to the other switches SWb_2 to SWb_i.

The voltage conversion circuit 37 converts the DC signal 23, resulting from consolidation in the consolidating circuit 36, to a predetermined voltage. In the example illustrated in FIG. 8, an instance is depicted in which the voltage conversion circuit 37 is configured in the form of a buck converter.

As illustrated in FIG. 8, the voltage conversion circuit 37 includes an inductor L11, a switch SW14, an oscillator circuit OSC12 and a control circuit 41. The DC signal 23 output from the consolidating circuit 36 is supplied to one end of the inductor L11. The other end of the inductor L11 is connected to the switch SW14. The switch SW14 connects the other end of the inductor L11 to ground potential or the output node Vout.

The oscillator circuit OSC12 supplies a clock signal to the control circuit 41. The control circuit 41 generates a control signal CTR_sw for controlling the switch SW14, using the clock signal supplied by the oscillator circuit OSC12. For instance, the control circuit 41 adjusts the pulse width and timing of the control signal CTR_sw, to control thereby the timing at which the switch SW14 connects the other end of the inductor L11 to ground potential, and the timing at which the switch SW14 connects the other end of the inductor L11 to the output node Vout.

In a case where the control signal CTR_sw is at a high level, the switch SW14 connects the other end of the inductor L11 to ground potential. In this case, the DC signal 23 is supplied to the inductor L11, and hence current flows in the inductor L11. Energy is stored as a result in the inductor L11. Thereafter, when the control signal CTR_sw is at a low level, the switch SW14 connects the other end of the inductor L11 to the output node Vout. As a result, the energy stored in the inductor L11 is output to the output node Vout. The output voltage Vout is determined in accordance with the pulse width (duty ratio) of the control signal CTR_sw. The pulse width (duty ratio) of the control signal CTR_sw can be worked out herein by calculating time at high level/(time at high level+time at low level). The output voltage Vout of the voltage conversion circuit 37 rises as the pulse width (duty ratio) of the control signal CTR_sw increases. The output Vout of the voltage conversion circuit 37 is supplied to the control circuit 38.

An example has been illustrated of an instance where the voltage conversion circuits 33_1 to 33_i provided in the consolidating units 31_1 to 31_i are made up of switched capacitors, and the voltage conversion circuit 37 provided in the power supply unit 35 is made up of a buck converter, but the circuits that make up the voltage conversion circuits 33_1 to 33_i and the voltage conversion circuit 37 are not limited to switched capacitors or a buck converter.

The configuration in the present embodiment may be such that quiescent power in the voltage conversion circuit 33_1 to 33_i respectively provided in each consolidating unit 31_1 to 31_i is lower than quiescent power in the voltage conversion circuit 37 provided in the power supply unit 35. The configuration in the present embodiment may be such that the conversion efficiency of the voltage conversion circuit 37 provided in the power supply unit 35 is higher than the conversion efficiency of the voltage conversion circuit 33_1 to 33_i respectively provided in each consolidating unit 31_1 to 31_i.

In the power supply device 2 according to the present embodiment, the voltage conversion circuits 33_1 to 33_i respectively provided in each consolidating unit 31_1 to 31_i supply power to the control circuits 34_1 to 34_i (of small load). The voltage conversion circuit 37 provided in the power supply unit 35 supplies power to the load circuit 18 (of large load). As a result, the oscillator circuit OSC11 installed in each voltage conversion circuit 33_1 to 33_i can be made slower than the oscillator circuit OSC12 installed in the voltage conversion circuit 37. Quiescent power in the voltage conversion circuits 33_1 to 33_i can accordingly be made smaller than quiescent power in the voltage conversion circuit 37.

In order to enhance conversion efficiency in the voltage conversion circuit 37, the pulse width and timing of the output pulse (clock signal) of the oscillator circuit OSC12 are adjusted finely, whereby power consumption increases in proportion. That is, complex timing control, for instance PFM control, PWM control, zero current control or the like is required in order to enhance conversion efficiency. The voltage conversion circuits 33_1 to 33_i respectively provided in each consolidating unit 31_1 to 31_i use a simple clock signal, and hence although quiescent power in the voltage conversion circuits 33_1 to 33_i is low, the conversion efficiency of the voltage conversion circuits 33_1 to 33_i is lower than that of the voltage conversion circuit 37.

In the power supply device 2 according to the present embodiment, DC signals output from a predetermined number of power sources are consolidated at the consolidating units 31_1 to 31_i, and the consolidated DC signals 22_1 to 22_i are supplied to the power supply unit 35. It becomes accordingly possible to curtail the length of wiring in the power supply device, and, therefore, to suppress drops in the power that is obtained in the power supply device as a whole.

In another conceivable configuration, supply of power to the consolidating units 31_1 to 31_i involves supply of power from the voltage conversion circuit 37 provided in the power supply unit 35 to the consolidating units 31_1 to 31_i. However, in a case where power is supplied by the voltage conversion circuit 37 provided in the power supply unit 35 to the consolidating units 31_1 to 31_i, wiring is necessary to connect the voltage conversion circuit 37 and each consolidating unit 31_1 to 31_i, and the length of wiring in the power supply device increases accordingly, which is problematic.

In the power supply device 2 according to the present embodiment, therefore, the voltage conversion circuits 33_1 to 33_i are provided in the consolidating units 31_1 to 31_i. The power source wiring, which connects the voltage conversion circuit 37 and each consolidating unit 31_1 to 31_i, is rendered accordingly unnecessary, and it becomes possible to curtail lengthening of wiring in the power supply device.

In this case, providing the voltage conversion circuits 33_1 to 33_i in the consolidating units 31_1 to 31_i results in power consumption proportional thereto, which can conceivably result, in turn, in less power being generated in the power supply device 2. In the power supply device 2 according to the present embodiment, however, power consumption by the voltage conversion circuits 33_1 to 33_i of the consolidating units 31_1 to 31_i can be kept very small, as explained above, and therefore the power generated in the power supply device 2 is virtually unaffected.

Specifically, various electronic circuits of substantial power consumption are connected, as a load, to the voltage conversion circuit 37 that is provided in the power supply unit 35. In consequence, a complex circuit with emphasis laid on conversion efficiency is used in the voltage conversion circuit 37 provided in the power supply device 2. Quiescent power is accordingly large herein.

The control circuits 34_1 to 34_i of small power consumption are connected, as a load, to the voltage conversion circuits 33_1 to 33_i provided in the consolidating units 31_1 to 31_i. It becomes accordingly possible to use circuits that are specialized not in conversion efficiency, but in reducing quiescent power, in the voltage conversion circuits 33_1 to 33_i provided in the consolidating units 31_1 to 31_i. Quiescent power in the voltage conversion circuits 33_1 to 33_i can be reduced as a result. In turn, this allows avoiding drops in the power that is generated in the power supply device 2.

Embodiment 3

Figure 9:
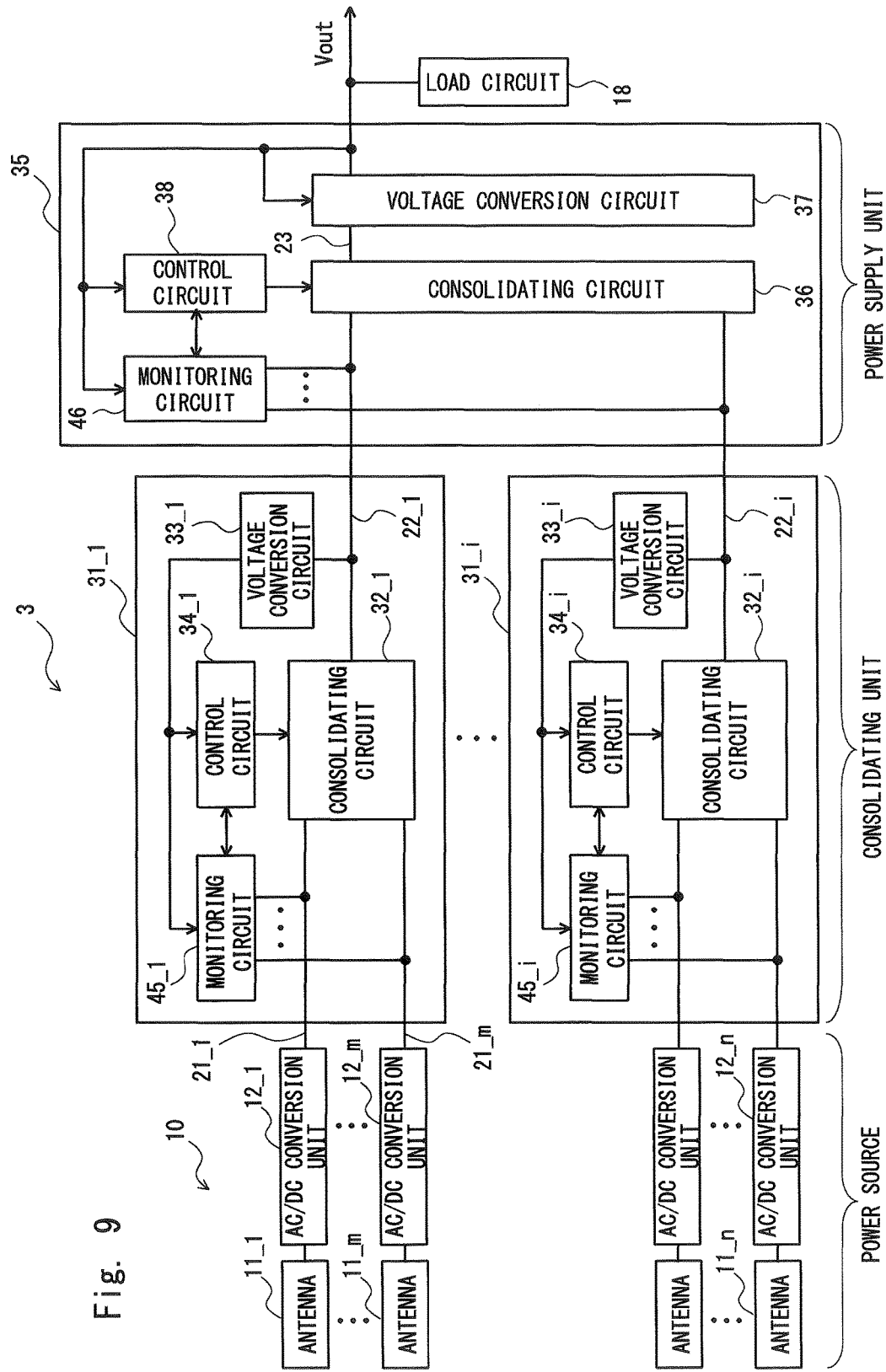
FIG. 9 is a block diagram illustrating a power supply device according to Embodiment 3.

Embodiment 3 will be explained next. FIG. 9 is a block diagram illustrating a power supply device 3 according to Embodiment 3. The power supply device 3 according to the present embodiment differs from the power supply device 2 explained in Embodiment 2 in that now monitoring circuits 45_1 to 45_i are provided in the consolidating units 31_1 to 31_i, and a monitoring circuit 46 is provided in the power supply unit 35. Other features are identical to those of the power supply devices 1, 2 explained in Embodiments 1 and 2; hence, identical constituent elements will be denoted with identical reference symbols, and recurrent features will not be explained again.

As illustrated in FIG. 9, the consolidating units 31_1 to 31_i provided in the power supply device 3 according to the present embodiment include consolidating circuits 32_1 to 32_i, voltage conversion circuits 33_1 to 33_i (second voltage conversion circuits), the control circuits 34_1 to 34_i (first control circuits) and the monitoring circuits 45_1 to 45_i (first monitoring circuits). The consolidating circuits 32_1 to 32_i have input thereinto the DC signals 21_1 to 21_n supplied by the AC/DC conversion units 12_1 to 12_n, and selectively consolidate the input DC signals 21_1 to 21_n. The consolidating circuits 32_1 to 32_i have the same configuration as that of the consolidating circuits 14_1 to 14_i illustrated in FIG. 1. Each voltage conversion circuit 33_1 to 33_i converts the voltage of the DC signals 22_1 to 22_i that are consolidated in each consolidating circuit 32_1 to 32_i. Each of the monitoring circuits 45_1 to 45_i monitors respective DC signals 21_1 to 21_n supplied by the AC/DC conversion units 12_1 to 12_n. Each control circuit 34_1 to 34_i respectively controls each consolidating circuit 32_1 to 32_i in accordance with the monitoring result in each of the monitoring circuits 45_1 to 45_i. Each voltage conversion circuit 33_1 to 33_i supplies power to each respective control circuit 34_1 to 34_i and each respective monitoring circuit 45_1 to 45_i.

Figure 10:
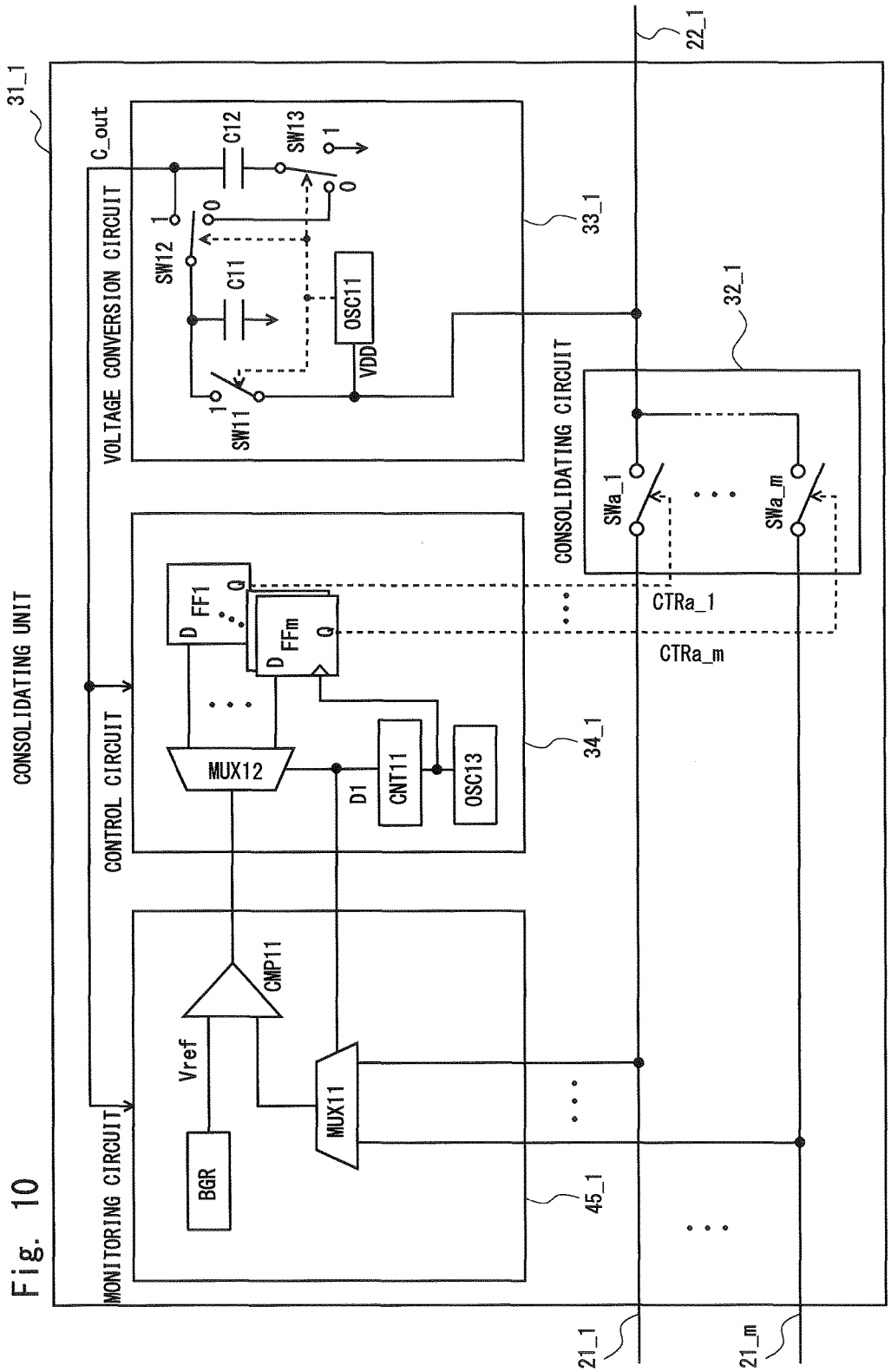
FIG. 10 is a circuit diagram illustrating an example of a consolidating unit provided in a power supply device according to Embodiment 3.

FIG. 10 is a circuit diagram illustrating an example of the consolidating unit 31_1 provided in the power supply device 3 according to the present embodiment. As illustrated in FIG. 10, the consolidating circuit 32_1 includes switches SWa_1 to SWa_m. Each switch SWa_1 to SWa_m is configured to be capable of switching the respective connection between each AC/DC conversion unit 12_1 to 12_m and the output node 22_1. The switches SWa_1 to SWa_m are controlled using control signals CTRa_1 to CTRa_m output from the control circuit 34.

The voltage conversion circuit 33_1 converts the DC signal 22_1, resulting from consolidation in the consolidating circuit 32_1 to 32_i, to a predetermined voltage. In the example illustrated in FIG. 10 a configuration is depicted in which the voltage conversion circuit 33_1 is configured in the form of a switched capacitor. The same explanation regarding the voltage conversion circuit 33_1 (see FIG. 7) explained in Embodiment 2 applies to the voltage conversion circuit 33_1 herein, and a recurrent explanation will be therefore omitted.

The monitoring circuit 45_1 includes a multiplexer MUX11, a reference voltage circuit BGR and a comparator CMP11. The multiplexer MUX11 selects any one of DC signals 21_1 to 21_m in accordance with a control signal D1 output from the control circuit 34_1, and outputs the selected DC signal to one of the inputs of the comparator CMP11. The reference voltage circuit BGR generates a predetermined reference voltage Vref (predetermined threshold value), and outputs the generated reference voltage Vref to the other input of the comparator CMP11. The comparator CMP11 compares the reference voltage Vref with the voltage of the DC signal selected by the multiplexer MUX11, and outputs the comparison result to the control circuit 34_1.

The control circuit 34_1 includes an oscillator circuit OSC13, a counter CNT11, a multiplexer MUX12, and flip-flops FF1 to FFm. The oscillator circuit OSC13 generates a clock signal, and outputs the generated clock signal to the counter CNT11 and the flip-flops FF1 to FFm. The counter CNT11 generates a counter value in synchrony with the clock signal, and outputs the generated counter value (control signal D1) to the multiplexers MUX11, 12. In accordance with the control signal D1, the multiplexer MUX12 outputs, to any one of the flip-flops FF1 to FFm, the output of the comparator CMP11. In accordance with the clock signal, the flip-flops FF1 to FFm output a held value (D input value), as the control signals CTRa_1 to CTRa_m.

The operation of the monitoring circuit 45_1 and the control circuit 34_1 will be explained next in detail. The multiplexer MUX11 provided in the monitoring circuit 45_1 selects any one of the DC signals 21_1 to 21_m, in accordance with the control signal D1, and outputs the selected DC signal to one of the inputs of the comparator CMP11. The comparator CMP11 compares the reference voltage Vref with the voltage of the DC signal selected by the multiplexer MUX11, and outputs the comparison result to the multiplexer MUX12. In accordance with the control signal D1, the multiplexer MUX12 outputs, to any one of the flip-flops FF1 to FFm, the output of the comparator CMP11.

In a case where, for instance, the DC signal selected by the multiplexer MUX11 is equal to or greater than the reference voltage Vref, the comparator CMP11 outputs a high-level signal ("1"), as the comparison result, to the multiplexer MUX12. On the other hand, in a case where the DC signal selected by the multiplexer MUX11 is smaller than the reference voltage Vref, the comparator CMP11 outputs a low-level signal ("0"), as the comparison result, to the multiplexer MUX12.

The control signal D1 is herein the counter value generated by the counter CNT11, and is a value corresponding to each DC signal 21_1 to 21_m and each flip-flop FF1 to FFm. In a case where, for instance, the counter value is "1", the multiplexer MUX11 selects the DC signal 21_1, and the multiplexer MUX12 outputs the output of the comparator CMP11 to the flip-flop FF1. In a case where the counter value is "2", the multiplexer MUX11 selects the DC signal 21_2, and the multiplexer MUX12 outputs the output of the comparator CMP11 to the flip-flop FF2. Similarly, in a case where the counter value is "m", the multiplexer MUX11 selects the DC signal 21_m, and the multiplexer MUX12 outputs the output of the comparator CMP11 to the flip-flop FFm. The counter increments the counter value in accordance with the clock signal generated by the oscillator circuit OSC13, and resets the counter value once the latter has completed one round (i.e. has counted up to "m").

In a case where the control signal D1 is "1", therefore, the comparator CMP11 compares the voltage of the DC signal 21_1 and the reference voltage Vref. If the voltage of the DC signal 21_1 is equal to or greater than the reference voltage Vref, the comparator CMP11 outputs the high-level signal ("1"). Therefore, "1" is held in the flip-flop FF1. In this case, the flip-flop FF1 outputs the high-level signal ("1") as the control signal CTRa_1, and hence the switch SWa_1 of the consolidating circuit 32_1 is brought to an on state (connection state). In a case where, on the other hand, the voltage of the DC signal 21_1 is smaller than the reference voltage Vref, the comparator CMP11 outputs the low-level signal ("0"), and hence "0" is held in the flip-flop FF1. In this case, the flip-flop FF1 outputs the low-level signal ("0") as the control signal CTRa_1, and hence the switch SWa_1 of the consolidating circuit 32_1 is brought to an off state (non-connection state).

The timing at which the output of the comparator CMP11 is stored in the flip-flops FF1 to FFm is the timing of the clock edge of the oscillator circuit OSC13. The value of the reference voltage Vref can be set to a value such that, from among the DC signals 21_1 to 21_m, only DC signals of sufficiently high voltage are supplied to the output node 22_1.

The power supply unit 35 illustrated in FIG. 9 includes the consolidating circuit 36, the voltage conversion circuit (first voltage conversion circuit), the control circuit 38 (second control circuit) and the monitoring circuit 46 (second monitoring circuit). The consolidating circuit 36 has input thereinto the DC signals 22_1 to 22_i respectively output from each consolidating unit 31_1 to 31_i, and selectively consolidates the input DC signals 22_1 to 22_i. The consolidating circuit 36 has the same configuration as that of the consolidating circuit 16 illustrated in FIG. 1. The voltage conversion circuit 37 converts the voltage of a DC signal 23 resulting from consolidation in the consolidating circuit 36. The monitoring circuit 46 monitors the DC signals 22_1 to 22_i respectively output from each consolidating unit 31_1 to 31_i. The control circuit 38 controls the consolidating circuit 36 in accordance with the monitoring result of the monitoring circuit 46. The voltage conversion circuit 37 supplies power to the control circuit 38 and the monitoring circuit 46.

Figure 11:
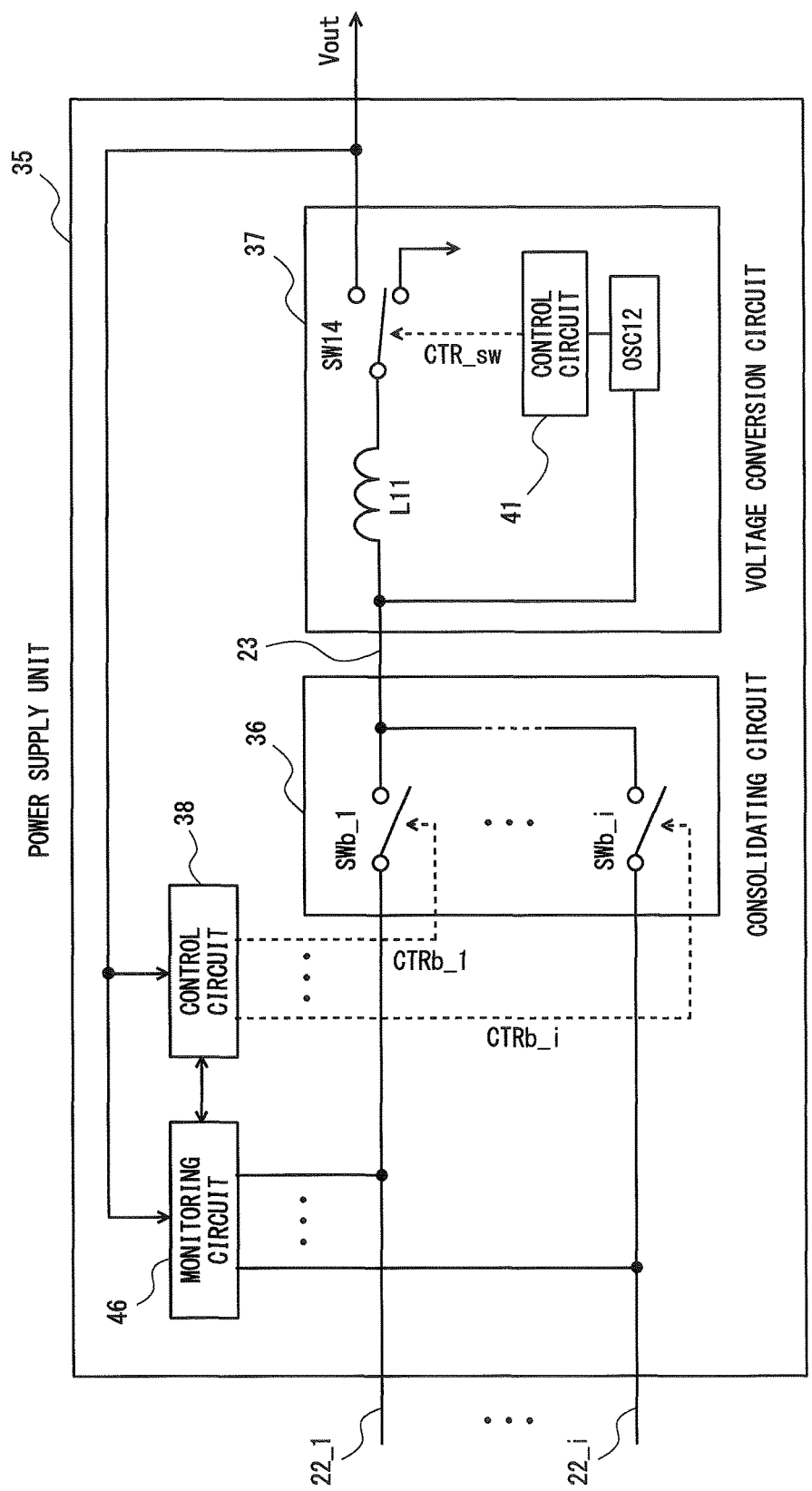
FIG. 11 is a circuit diagram illustrating an example of a power supply unit provided in a power supply device according to Embodiment 3.

FIG. 11 is a circuit diagram illustrating an example of the power supply unit 35 provided in the power supply device 3 according to the present embodiment. As illustrated in FIG. 11, the consolidating circuit 36 includes switches SWb_1 to SWb_i. Each switch SWb_1 to SWb_i is configured to be capable of switching the connection of the respective output nodes 22_1 to 22_i of each consolidating unit 31_1 to 31_i and the output node 23 of the consolidating circuit 36. The switches SWb_1 to SWb_i are controlled using control signals CTRb_1 to CTRb_i that are output from the control circuit 38.

The voltage conversion circuit 37 converts the DC signal 23, resulting from consolidation in the consolidating circuit 36, to a predetermined voltage. In the example illustrated in FIG. 11, an instance is depicted in which the voltage conversion circuit 37 is configured in the form of a buck converter. The same explanation regarding the voltage conversion circuit 37 (see FIG. 8) explained in Embodiment 2 applies to the voltage conversion circuit 37 herein, and a recurrent explanation will be therefore omitted.

The configuration and operation of the control circuit 38 provided in the power supply unit 35 are identical to the configuration and operation of the control circuit 34_1 provided in the consolidating unit 31_1 illustrated in FIG. 10, and hence a recurrent explanation will be omitted. The configuration and operation of the monitoring circuit 46 provided in the power supply unit 35 are likewise identical to the configuration and operation of the monitoring circuit 45_1 provided in the consolidating unit 31_1 illustrated in FIG. 10, and hence a recurrent explanation will be omitted.

The DC signals 22_1 to 22_i that are supplied to the power supply unit 35 are signals after consolidating in the consolidating units 31_1 to 31_i. As a result, the voltage of the DC signals 22_1 to 22_i is higher than the voltage of the DC signals 21_1 to 21_n that are supplied to the consolidating units 31_1 to 31_i. Accordingly, the reference voltage Vref of the comparator provided in the monitoring circuit 46 of the power supply unit 35 is set to a higher value than the reference voltage Vref of the comparator provided in the monitoring circuit 45_1 of the consolidating unit 31_1.

In the power supply device 3 according to the present embodiment, as explained above, the monitoring circuits 45_1 to 45_i are provided, in the consolidating units 31_1 to 31_i, to monitor the voltage of the DC signals 21_1 to 21_n, such that the consolidating circuits 32_1 to 32_i are controlled in accordance with the monitoring result of the monitoring circuits 45_1 to 45_i. The monitoring circuit 46 is provided, in the power supply unit 35, to monitor the voltage of the DC signals 22_1 to 22_i, such that the consolidating circuit 36 is controlled in accordance with the monitoring result of the monitoring circuit 46. Accordingly, the connection state of the switches in the consolidating circuits 32_1 to 32_i, 36 can be controlled automatically, also upon changes in the state of the radio waves that are received by the antennas. Power can therefore be generated efficiently.

A configuration has been explained above in which the consolidating units 31_1 to 31_i and the power supply unit 35 include the monitoring circuits 45_1 to 45_i and the monitoring circuit 46, respectively. In the present embodiment, however, the monitoring circuits 45_1 to 45_i may alternatively be provided in the consolidating units 31_1 to 31_i alone, or the monitoring circuit 46 be provided in the power supply unit 35 alone.

Embodiment 4

Figure 12:
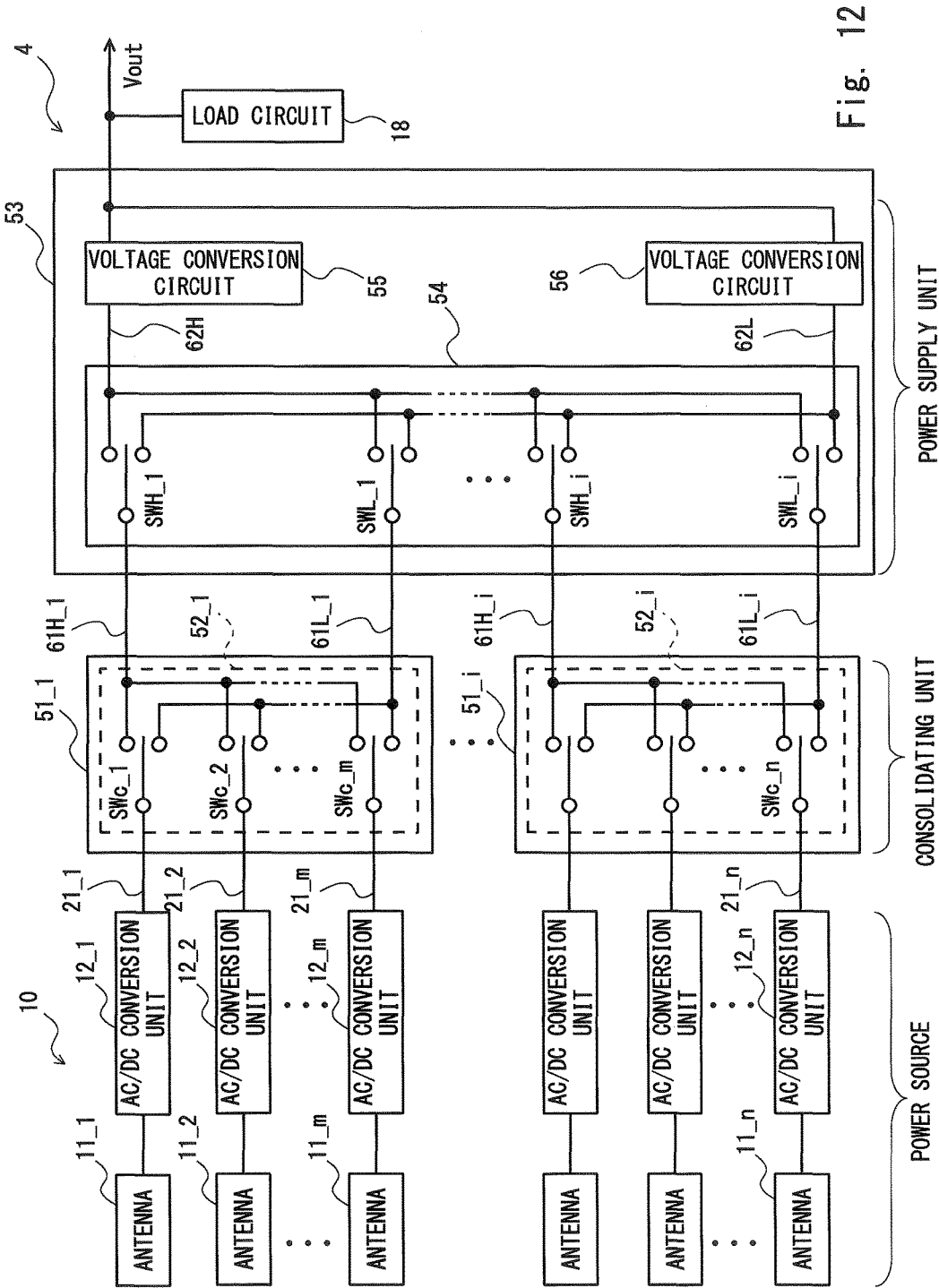
FIG. 12 is a block diagram illustrating a power supply device according to Embodiment 4.

Embodiment 4 will be explained next. FIG. 12 is a block diagram illustrating a power supply device 4 according to Embodiment 4. A power supply device 4 according to the present embodiment differs from the power supply device 1 explained in Embodiment 1 in that now each consolidating circuit 52_1 to 52_i includes two output nodes 61H, 61L, the consolidating circuit 54 of the power supply unit 53 includes two output nodes 62H, 62L, and the power supply unit 53 includes two voltage conversion circuits 55, 56. Other features are identical to those of the power supply device 1 explained in Embodiment 1, and hence identical constituent elements will be denoted with identical reference symbols, and recurrent features will not be explained again.

As illustrated in FIG. 12, the power supply device 4 according to the present embodiment includes a plurality of antennas 11_1 to 11_n, a plurality of AC/DC conversion units 12_1 to 12_n, a plurality of consolidating units 51_1 to 51_i and a power supply unit 53. The antennas 11_1 to 11_n and AC/DC conversion units 12_1 to 12_n are identical to those explained in Embodiment 1, and hence a recurrent explanation will be omitted herein.

Each consolidating unit 51_1 to 51_i has input thereinto the DC signals 21_1 to 21_n respectively supplied by each AC/DC conversion unit 12_1 to 12_n, and selectively consolidates the input DC signals 21_1 to 21_n. Each consolidating unit 51_1 to 51_i includes a respective consolidating circuit 52_1 to 52_i. The consolidating circuit 52_1 includes switches SWa_1 to SWa_m provided so as to correspond to the AC/DC conversion units 12_1 to 12_m. Each switch SWc_1 to SWc_m is configured to be capable of switching between three states, namely a state in which the output side of each AC/DC conversion unit 12_1 to 12_m and an output node 61H_1 (first output node) are connected, a state in which the output side of each AC/DC conversion unit 12_1 to 12_m and an output node 61L_1 (second output node) are connected, and a state in which the output side of each AC/DC conversion unit 12_1 to 12_m is in an open state (i.e. not connected to either the output node 61H_1 or the output node 61L_1).

In a case where, for instance, the voltage of the DC signal 21_1 supplied by the AC/DC conversion unit 12_1 is equal to or greater than a threshold value Vt1 (first threshold value), the consolidating circuit 52_1 connects the output side of the AC/DC conversion unit 12_1 and the output node 61H_1, and the DC signal 21_1 is supplied to the output node 61H_1. In a case where the voltage of the DC signal 21_1 supplied by the AC/DC conversion unit 12_1 is equal to or greater than a threshold value Vt2 but smaller than the threshold value Vt1, the consolidating circuit 52_1 connects the output side of the AC/DC conversion unit 12_1 and the output node 61L_1, and the DC signal 21_1 is supplied to the output node 61L_1. In a case where the voltage of the DC signal 21_1 supplied by the AC/DC conversion unit 12_1 is smaller than the threshold value Vt2, the consolidating circuit 52_1 brings on a state where the output side of the AC/DC conversion unit 12_1 is open. The threshold values Vt1 and Vt2 obey the relationship 0<Vt2<Vt1.

By controlling thus the switches SWc_1 to SWc_m, the consolidating circuit 52_1 selectively consolidates the plurality of DC signals 21_1 to 21_m supplied by the AC/DC conversion units 12_1 to 12_m to either one of the two output nodes 61H_1, 61L_1. The same applies to the other consolidating units 51_2 to 51_i (consolidating circuits 51_2 to 51_i).

In a case where antennas that receive strong radio waves are mixed with antennas that receive weak radio waves (radio waves which, although non-zero, are extremely weak), from among the plurality of antennas 11_1 to 11_n, the AC/DC conversion units connected to antennas that receive weak radio waves are disconnected in the power supply device 1 according to Embodiment 1. Doing so makes it possible to suppress the flow of leakage current into the AC/DC conversion units connected to antennas that receive weak radio waves, and to curtail drops in the power generated in the power supply device 1.

In such a case, however, a state is brought about in which the power recovered in antennas that receive weak radio waves is wasted. In the present embodiment, accordingly, there are provided two nodes, namely the high voltage-side output node 61H_1 and the low voltage-side output node 61L_1, as the output node of the consolidating circuit 52_1, such that the supply destination of the DC signals 21_1 to 21_n is switched in accordance with the voltage the DC signals 21_1 to 21_n that are supplied by the AC/DC conversion units 12_1 to 12_n.

In a case where, for instance, the voltage of the DC signals 21_1 to 21_n is high (equal to or greater than the threshold value Vt1), the DC signals 21_1 to 21_n are supplied to the high voltage-side output node 61H_1. In a case where the voltage of the DC signals 21_1 to 21_n is low (equal to or greater than the threshold value Vt2 but smaller than the threshold value Vt1), the DC signals 21_1 to 21_n are supplied to the low voltage-side output node 61L_1. In a case where the voltage of the DC signals 21_1 to 21_n is substantially equal to zero (smaller than the threshold value Vt2), the DC signals 21_1 to 21_n are not supplied to either the output node 61H_1 or the output node 61L_1. By doing so, it becomes possible to utilize effectively power that is recovered in antennas that receive weak radio waves, while suppressing flow of leakage current into the AC/DC conversion units.

The power supply unit 53 includes the consolidating circuit 54 and the voltage conversion circuits 55, 56. The consolidating circuit 54 includes switches SWH_1 to SWH_i that are provided so as to correspond to the output nodes 61H_1 to 61H_i, on the high potential side, of the consolidating units 51_1 to 51_i, and switches SWL_1 to SWL_i that are provided so as to correspond to the output nodes 61L_1 to 61L_i, on the low potential side, of the consolidating units 51_1 to 51_i.

Each switch SWH_1 to SWH_i is configured to be capable of switching between three states, namely a state in which the output nodes 61H_1 to 61H_i and the output node 62H (third output node) are connected, a state in which the respective output nodes 61H_1 to 61H_i and the output node 62L (fourth output node) are connected, and a state in which each output node 61H_1 to 61H_i is in an open state (i.e. not connected to either the output node 62H or the output node 62L).

Similarly, each switch SWL_1 to SWL_i is configured to be capable of switching between three states, namely a state in which the output nodes 61L_1 to 61L_i and the output node 62H (third output node) are connected, a state in which the output nodes 61L_1 to 61L_i and the output node 62L (fourth output node) are connected, and a state in which each output node 61L_1 to 61L_i is in an open state (i.e. not connected to either the output node 62H or the output node 62L).

For instance, the switch SWH_1 of the consolidating circuit 54 supplies the DC signal 61H_1 to the output node 62H in a case where the voltage of the DC signal 61H_1 supplied by the consolidating unit 51_1 is equal to or greater than a threshold value Vt3 (second threshold value). The switch SWH_1 supplies the DC signal 61H_1 to the output node 62L in a case where the voltage of the DC signal 61H_1 supplied by the consolidating unit 51_1 is equal to or greater than a threshold value Vt4 and smaller than the threshold value Vt3. In a case where the voltage of the DC signal 61H_1 supplied by the consolidating unit 51_1 is smaller than the threshold value Vt4, the switch SWH_1 does not supply the DC signal 61H_1 to either the output node 62H or the output node 62L. The threshold values Vt3 and Vt4 obey 0<Vt4<Vt3. The same applies to the other switches SWH_2 to SWH_i.

In a case where, for instance, the voltage in the DC signal 61L_1 supplied by the consolidating unit 51_1 is equal to or greater than the threshold value Vt3, the switch SWL_1 of the consolidating circuit 54 supplies the DC signal 61L_1 to the output node 62H. The switch SWL_1 supplies the DC signal 61L_1 of the output node 62L in a case where the voltage of the voltage of the DC signal 61L_1 supplied by the consolidating unit 51_1 is equal to or greater than the threshold value Vt4 and smaller than the threshold value Vt3. In a case where the voltage of the DC signal 61L_1 supplied by the consolidating unit 51_1 is smaller than the threshold value Vt4, the switch SWL_1 does not supply the DC signal 61L_1 to either the output node 62H or the output node 62L. The same applies to the other switches SWL_2 to SWL_i.

The voltage conversion circuit 55 converts the voltage of the DC signal (DC signal of the output node 62H, hereafter notated as DC signal 62H) resulting from consolidation in the consolidating circuit 54. Specifically, the voltage conversion circuit 55 boosts the DC signal 62H to a predetermined voltage, and outputs the boosted output voltage Vout to the load circuit 18.

The voltage conversion circuit 56 converts the voltage of the DC signal (DC signal of the output node 62L, hereafter notated as DC signal 62L) resulting from consolidation in the consolidating circuit 54. Specifically, the voltage conversion circuit 56 boosts the DC signal 62L to a predetermined voltage, and outputs the boosted output voltage Vout to the load circuit 18. In this case, the voltage conversion circuit 56 boosts the signals to a voltage comparable to the output voltage Vout of the voltage conversion circuit 55. Specifically, the voltage of the DC signal 62L is lower than the voltage of the DC signal 62H, and hence the boost width of the voltage conversion circuit 56 is larger than the boost width of the voltage conversion circuit 55.

In the power supply device 4 according to the present embodiment, as explained above, two output nodes 61H, 61L are provided in each consolidating circuit 52_1 to 52_i, two output nodes 62H, 62L are provided in the consolidating circuit 54 of the power supply unit 53, and two voltage conversion circuits 55, 56 are provided in the power supply unit 53. It becomes accordingly possible to utilize effectively power that is recovered in antennas that receive weak radio waves, while suppressing flow of leakage current into the AC/DC conversion units.

Features pertaining to Embodiments 2 and 3 explained above may be applied to the power supply device 4 according to the present embodiment.

Embodiment 5

Figure 13:
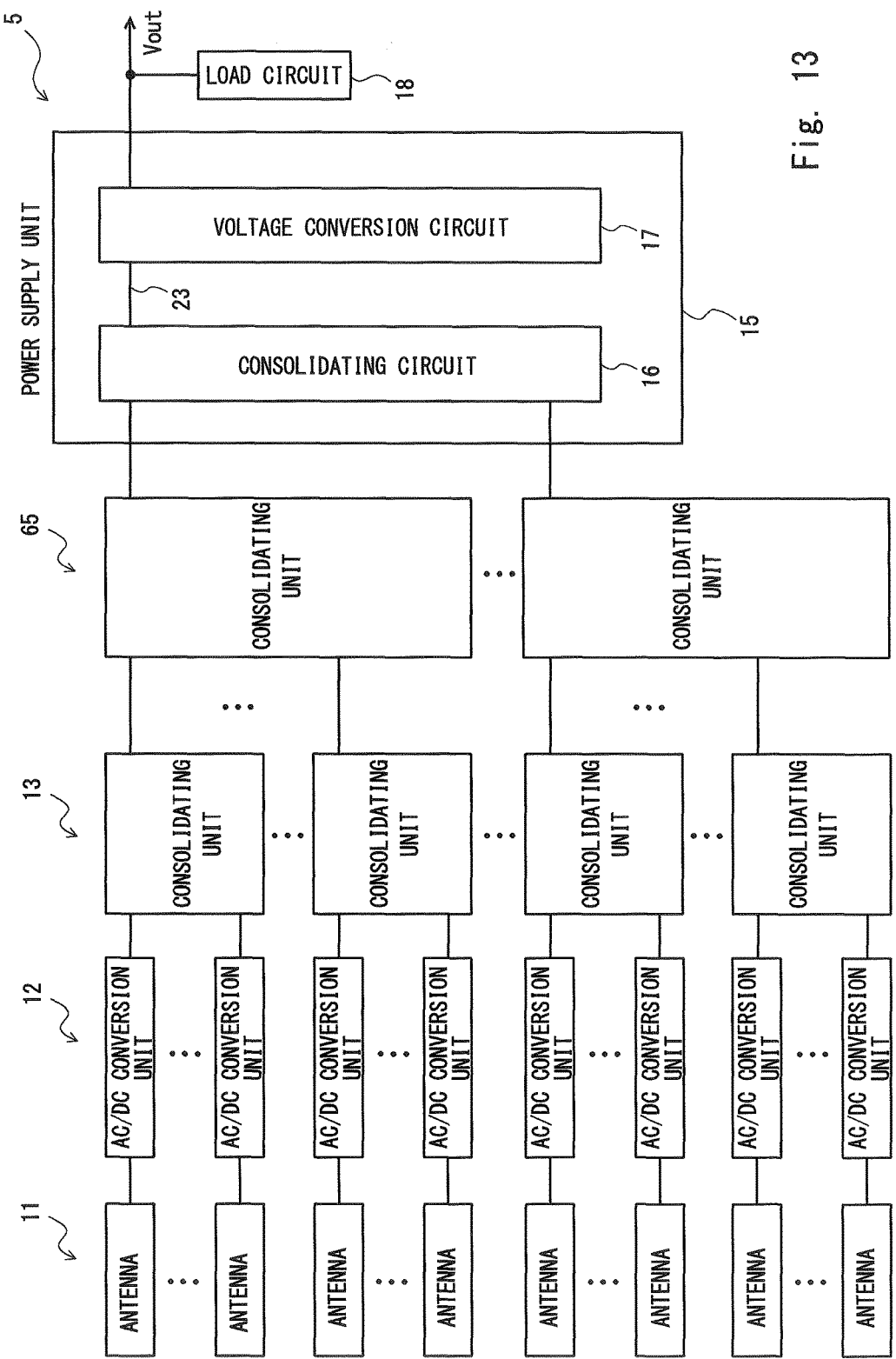
FIG. 13 is a block diagram illustrating a power supply device according to Embodiment 5.

Embodiment 5 will be explained next. FIG. 13 is a block diagram illustrating a power supply device 5 according to Embodiment 5. The power supply device 5 according to the present embodiment differs from the power supply device 1 explained in Embodiment 1 in that now consolidating units 65 are further provided between the consolidating units 13 and the power supply unit 15. Other features are identical to those of the power supply device 1 explained in Embodiment 1, and hence identical constituent elements will be denoted with identical reference symbols, and recurrent features will not be explained again.

As illustrated in FIG. 13, the power supply device 5 according to the present embodiment includes a plurality of antennas 11, a plurality of AC/DC conversion units 12, first-stage consolidating units 13 (first consolidating circuits), second-stage consolidating units 65 (third consolidating circuits) and a power supply unit 15. The antennas 11 and the AC/DC conversion units 12 are identical to those of the instance explained in Embodiment 1, and hence a recurrent explanation will be omitted herein.

Each consolidating unit 13 has input thereinto a plurality of DC signals supplied by respective AC/DC conversion units 12, and selectively consolidates the input plurality of DC signals. Each consolidating unit 13 includes a consolidating circuit (see FIG. 1, FIG. 5).

Each consolidating unit 65 has input thereinto respective DC signals resulting from consolidation in the consolidating units 13, and selectively consolidates the input plurality of DC signals. Each consolidating unit 65 includes a consolidating circuit, a voltage conversion circuit and a control circuit. The configuration of each consolidating unit 65 is identical to the configuration of each consolidating unit 13 (see, for instance, consolidating units 31_1 to 31_i in FIG. 5), and hence a recurrent explanation will be omitted herein. For instance, the power source circuit 5 includes M consolidating units (consolidating circuits) 13 and N (N<M) consolidating units (consolidating circuits) 65.

The power supply unit 15 includes the consolidating circuit 16 and the voltage conversion circuit 17. The consolidating circuit 16 has input thereinto the DC signals that are output from each consolidating unit 65, and selectively consolidates the input plurality of DC signals. The configuration of power supply unit 15 is identical to that of the power supply unit 15 provided in the power supply device 1 according to Embodiment 1, and hence a recurrent explanation will be omitted herein.

In the power supply device 5 according to the present embodiment, the consolidating units 65 are provided between the consolidating units 13 and the power supply unit 15. It becomes accordingly possible to curtail the length of wiring in the power supply device 5, even when, for instance, the number of antennas 11 is large.

An instance has been illustrated above wherein the consolidating units (consolidating circuits) have been configured in two stages (consolidating units 13, consolidating units 65), but the consolidating units may be configured in three or more stages. Features pertaining to Embodiments 2 and 4 explained above may be applied to the power supply device 5 according to the present embodiment.

Embodiment 6

Embodiment 6 will be explained next. In Embodiment 6, a configuration example is illustrated of an instance where the power supply devices 1 to 5 explained in Embodiments 1 to 5 are disposed on substrates.

Figure 14:
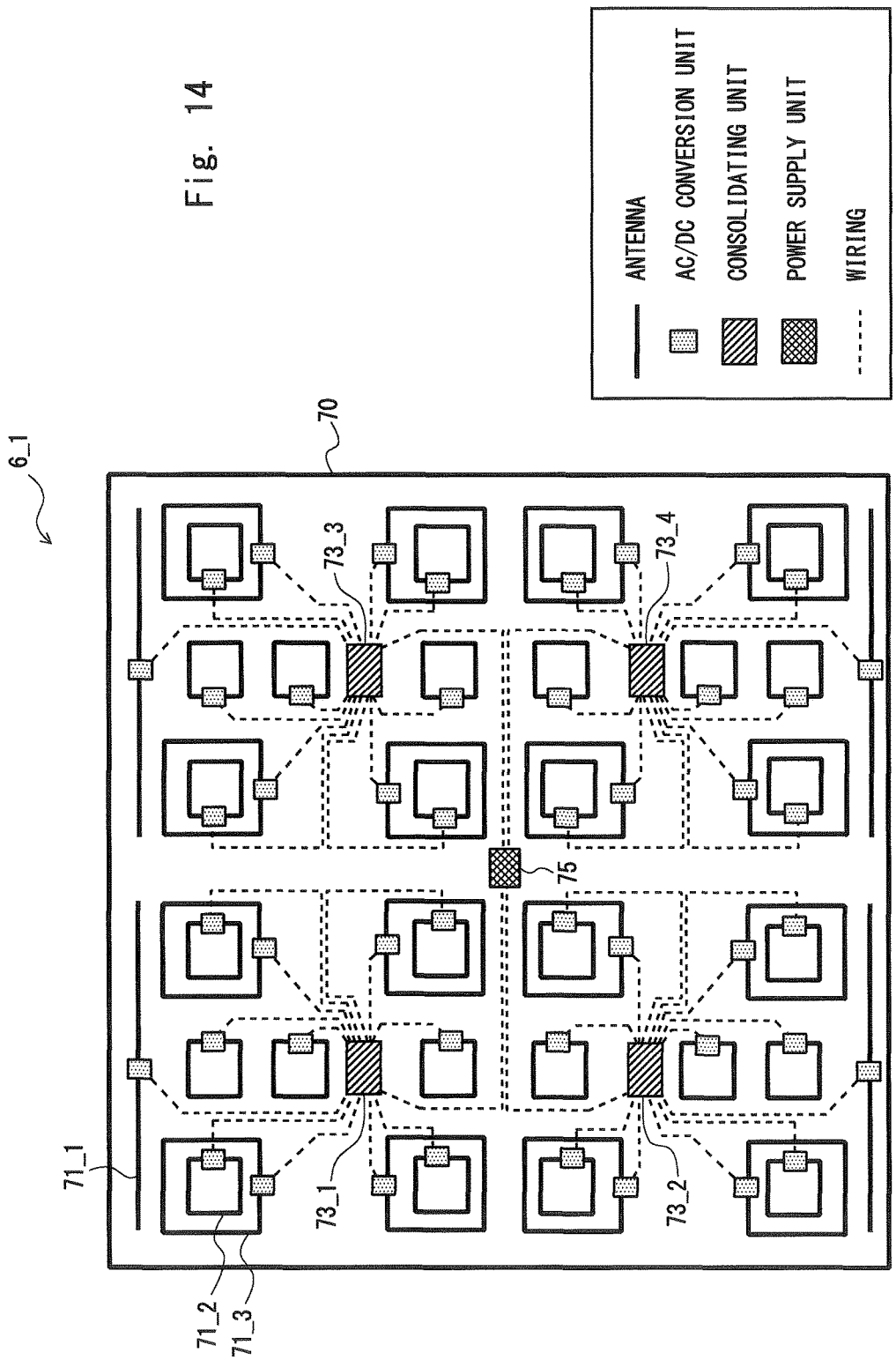
FIG. 14 is a top-view diagram illustrating an example of a power supply device according to Embodiment 6.

FIG. 14 is a top-view diagram illustrating an example of a power supply device 6_1 according to Embodiment 6. The power supply device 6_1 illustrated in FIG. 14 includes 48 antennas, 48 AD/DC conversion units, four consolidating units 73_1 to 73_4, and one power supply unit 75, on a substrate 70. The power supply device 6_1 includes three types of antenna 71_1 to 71_3, and hence can receive radio waves of three types of frequency band. The AC signals received by each antenna are converted to DC signals in respective AC/DC conversion units, and the DC signals after conversion are supplied to respective consolidating units 73_1 to 73_4. In the power supply device 6_1 illustrated in FIG. 14, twelve DC signals (output of the AC/DC conversion units) are respectively supplied to each consolidating unit 73_1 to 73_4. The respective DC signals output from each consolidating unit 73_1 to 73_4 are supplied to the power supply unit 75.

Figure 15:
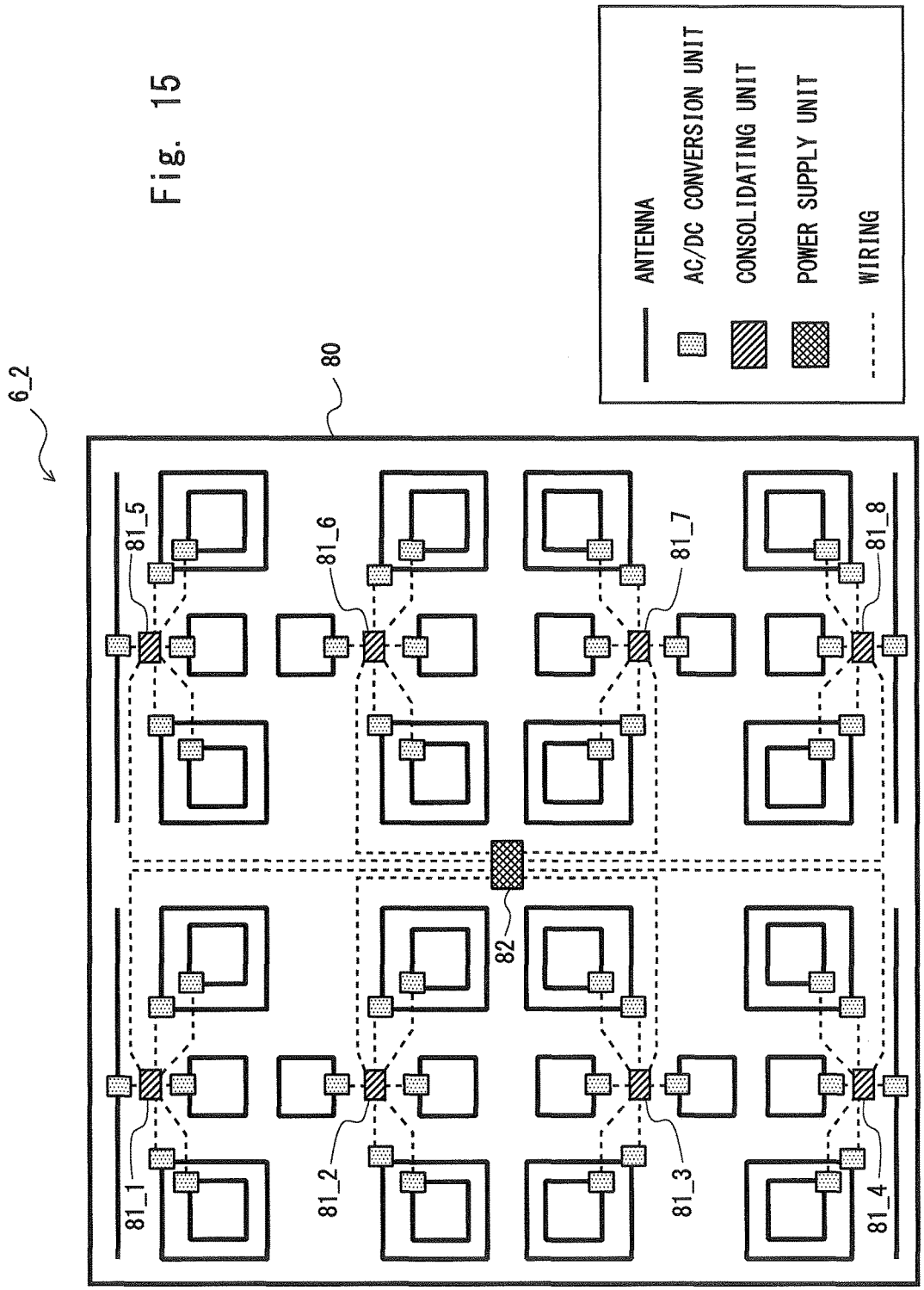
FIG. 15 is a top-view diagram illustrating an example of a power supply device according to Embodiment 6.

FIG. 15 is a top-view diagram illustrating an example of a power supply device 6_2 according to Embodiment 6. The power supply device 6_2 illustrated in FIG. 15 includes 48 antennas, 48 AD/DC conversion units, eight consolidating units 81_1 to 81_8 and one power supply unit 82, on a substrate 80. The power supply device 6_2 includes three types of antenna, and hence can receive radio waves of three types of frequency band. The AC signals received by each antenna are converted to DC signals in respective AC/DC conversion units, and the DC signals after conversion are supplied to respective consolidating units 81_1 to 81_8. In the power supply device 6_2 illustrated in FIG. 15, six DC signals (output of the AC/DC conversion units) are respectively supplied to each consolidating unit 81_1 to 81_8. The respective DC signals output from each consolidating unit 81_1 to 81_8 are supplied to the power supply unit 82. In the power supply device 6_2 illustrated in FIG. 15 there are provided eight consolidating units 81_1 to 81_8, and hence the total wiring length can be shortened with respect to that of the power supply device 6_1 illustrated in FIG. 14.

Figure 16:
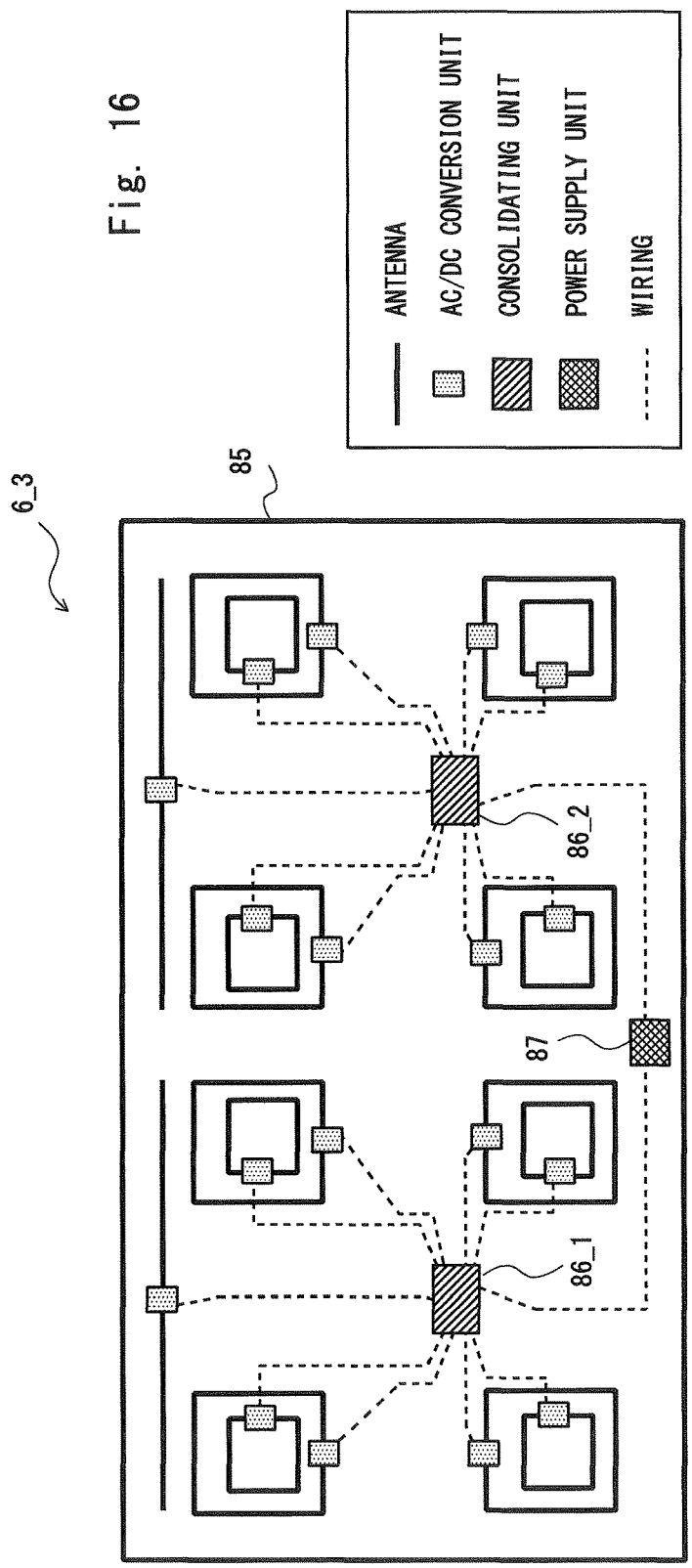
FIG. 16 is a top-view diagram illustrating an example of a power supply device according to Embodiment 6.

FIG. 16 is a top-view diagram illustrating an example of a power supply device 6_3 according to Embodiment 6. The power supply device 6_3 illustrated in FIG. 16 includes eighteen antennas, eighteen AD/DC conversion units, two consolidating unit 86_1 to 86_2, and one power supply unit 87, on a substrate 85. The power supply device 6_3 includes three types of antenna, and hence can receive radio waves of three types of frequency band. The AC signals received by each antenna are converted to DC signals in respective AC/DC conversion units, and the DC signals after conversion are supplied to respective consolidating units 86_1 to 86_2. In the power supply device 6_3 illustrated in FIG. 16, nine DC signals (output of the AC/DC conversion units) are respectively supplied to each consolidating unit 86_1 to 86_2. The respective DC signals output from each consolidating unit 86_1 to 86_2 are supplied to the power supply unit 87.

Figure 17:
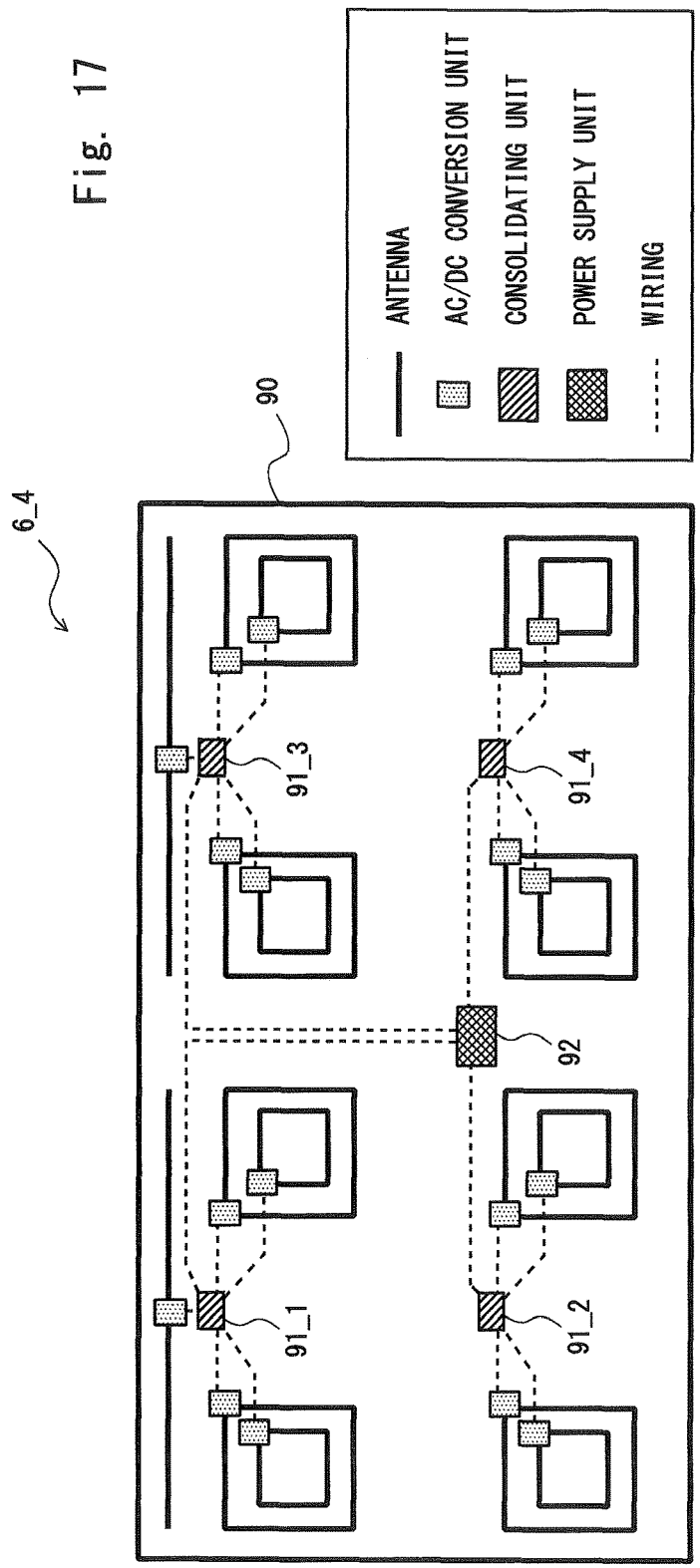
FIG. 17 is a top-view diagram illustrating an example of a power supply device according to Embodiment 6.

FIG. 17 is a top-view diagram illustrating an example of a power supply device 6_4 according to Embodiment 6. The power supply device 6_4 illustrated in FIG. 17 includes eighteen antennas, eighteen AD/DC conversion units, four consolidating units 91_1 to 91_4, and one power supply unit 92, on a substrate 90. The power supply device 6_4 includes three types of antenna, and hence can receive radio waves of three types of frequency band. The AC signals received by each antenna are converted to DC signals in respective AC/DC conversion units, and the DC signals after conversion are supplied to respective consolidating units 91_1 to 91_4. In the power supply device 6_4 illustrated in FIG. 17, four or five DC signals (output of the AC/DC conversion units) are respectively supplied to each consolidating unit 91_1 to 91_4. The respective DC signals output from each consolidating unit 91_1 to 91_4 are supplied to the power supply unit 92.

Figure 18:
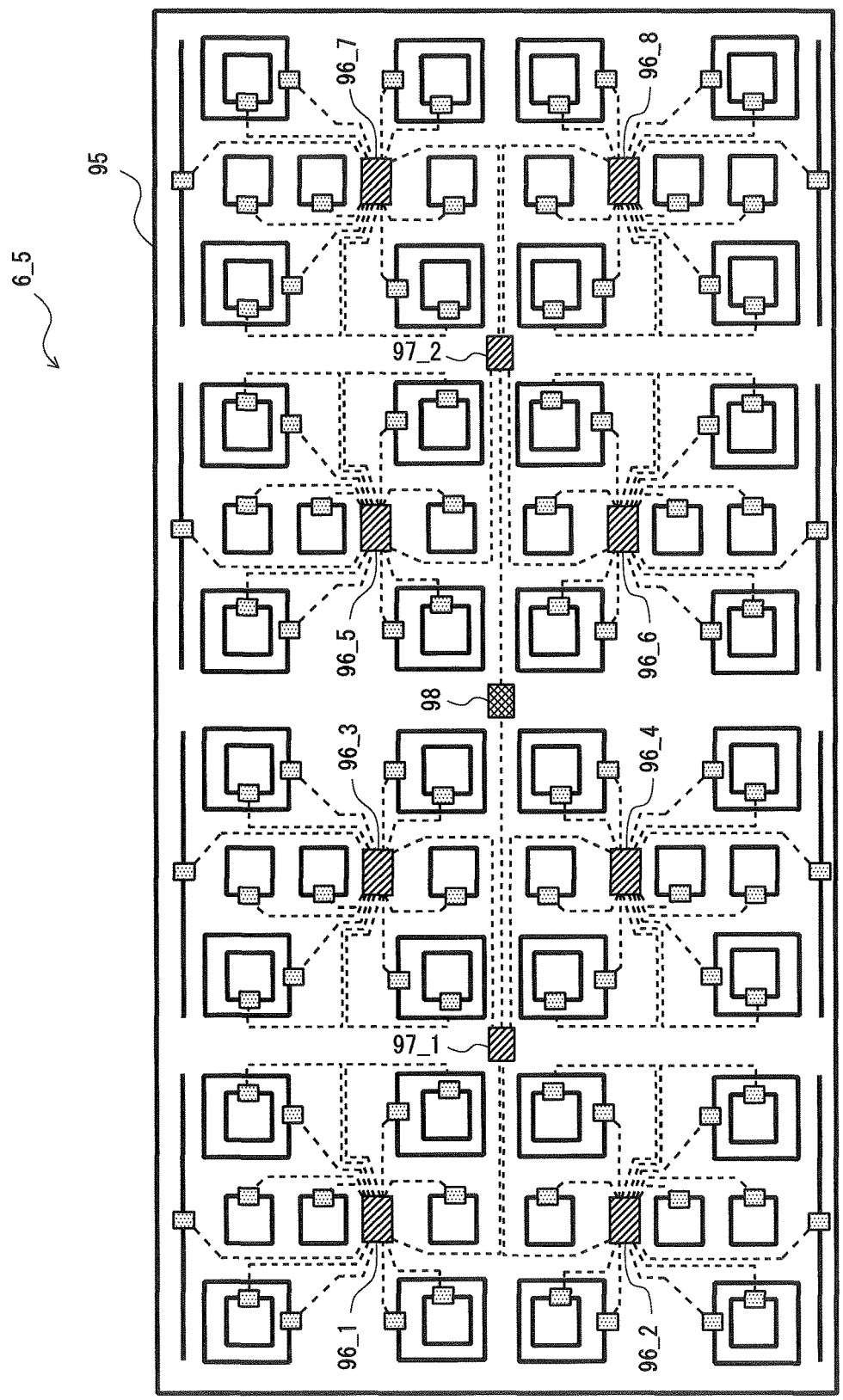
FIG. 18 is a top-view diagram illustrating an example of a power supply device according to Embodiment 6.

FIG. 18 is a top-view diagram illustrating an example of a power supply device 6_5 according to Embodiment 6, and depicting a power supply device (see Embodiment 5) in which the consolidating units are configured over two stages. The power supply device 6_5 illustrated in FIG. 18 includes 96 antennas, 96 AD/DC conversion units, eight consolidating units (first-stage consolidating units) 96_1 to 96_8, and two consolidating units (second-stage consolidating unit) 97_1 to 97_2, on a substrate 95.

The power supply device 6_5 includes three types of antenna, and hence can receive radio waves of three types of frequency band. The AC signals received by each antenna on the substrate 95 are converted to DC signals in respective AC/DC conversion units, and the DC signals after conversion are supplied to respective consolidating units 96_1 to 96_8. Herein, twelve DC signals (output of the AC/DC conversion units) are respectively supplied to each consolidating unit 96_1 to 96_8 on the substrate 95. The respective DC signals output from each consolidating unit 96_1 to 96_4 are supplied to the second-stage consolidating unit 97_1. The respective DC signals output from each consolidating unit 96_5 to 96_8 are supplied to the second-stage consolidating unit 97_2. The DC signal output from the consolidating unit 97_1, and the DC signal output from the consolidating unit 97_2, are supplied to the power supply unit 98.

In the power supply device 6_5 illustrated in FIG. 18, the consolidating units are configured over two stages, and hence it becomes possible to curtail the length of wiring in the power supply device 6_5, even when the number of antennas is large.

The first to sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:
1. A power supply device comprising:
a plurality of power sources each including an antenna and an AC/DC conversion unit that converts an AC signal received by the antenna to a DC signal;
a plurality of consolidating units each including a first consolidating circuit to which a plurality of DC signals are supplied from the plurality of power sources, each of the first consolidating circuits including a plurality of first switches connected between the plurality of power sources and a first output node of the first consolidating circuit; and
a power supply unit that includes a second consolidating circuit and a first voltage conversion circuit that converts a DC signal resulting from consolidation in the second consolidating circuit, to a predetermined voltage,
wherein the second consolidating circuit is supplied with the DC signals output from the first output nodes of the first consolidating circuits, and the second consolidating circuit includes a plurality of second switches connected between the plurality of first output nodes and a second output node.

2. The power supply device according to claim 1, wherein each of the consolidating units includes:
a second voltage conversion circuit that converts a DC signal resulting from consolidation in the first consolidating circuit, to a predetermined voltage; and a first control circuit, to which power is supplied from the second voltage conversion circuit, the first control circuit controlling the first consolidating circuit, and the power supply unit includes a second control circuit, to which power is supplied from the first voltage conversion circuit, the second control circuit controlling the second consolidating circuit.

3. The power supply device according to claim 2, wherein quiescent power in the second voltage conversion circuit provided in each of the consolidating units is lower than quiescent power in the first voltage conversion circuit provided in the power supply unit.

4. The power supply device according to claim 2, wherein
each of the consolidating units includes a first monitoring circuit that monitors the plurality of DC signals supplied by the plurality of power sources, and
the first control circuit controls the first consolidating circuit in accordance with a monitoring result in the first monitoring circuit.

5. The power supply device according to claim 4, wherein in a case where voltage of the DC signal supplied by each of the power sources is equal to or greater than a predetermined threshold value, the first control circuit controls each of the first switches in such a manner that the power source and the first output node are connected.

6. The power supply device according to claim 2, wherein
the power supply unit includes a second monitoring circuit that monitors the plurality of DC signals output from the plurality of consolidating units, and
the second control circuit controls the second consolidating circuit in accordance with a monitoring result in the second monitoring circuit.

7. The power supply device according to claim 6, wherein in a case where voltage of the DC signal supplied by the first output node of each of the consolidating units is equal to or greater than a predetermined threshold value, the second control circuit controls each of the second switches in such a manner that the first output node of the consolidating unit and the second output node of the second consolidating circuit are connected.

8. The power supply device according to claim 1, wherein
the first switch connects the power source and a third output node, in a case where voltage of the DC signal supplied by the power source is equal to or greater than a first threshold value, and
the first switch connects the power source and a third output node, in a case where voltage of the DC signal supplied by the power source is smaller than the first threshold value.

9. The power supply device according to claim 8, wherein
the second switch outputs a DC signal having a voltage equal to or greater than a second threshold value, from among the plurality of DC signals that are respectively supplied by the first and third output nodes, to a fourth output node,
the second switch outputs a DC signal having a voltage smaller than a second threshold value, from among the plurality of DC signals that are respectively supplied by the first and third output nodes, to a fifth output node,
the first voltage conversion circuit includes:
a high voltage-side voltage conversion circuit that converts a DC signal output from the fourth output node, to a predetermined voltage; and
a low voltage-side voltage conversion circuit that converts a DC signal output from the fifth output node, to a predetermined voltage.

10. The power supply device according to claim 1, wherein the consolidating unit further includes a third consolidating circuit that selectively consolidates a plurality of DC signals respectively resulting from consolidation in the plurality of first consolidating circuits, and that outputs the respective consolidated DC signals to the power supply unit.

11. The power supply device according to claim 10, wherein the consolidating unit includes M first consolidating circuits and N (N<M) third consolidating circuits.

12. The power supply device according to claim 1, wherein
the plurality of power sources is disposed on a substrate,
a plurality of consolidating chips that respectively make up the consolidating unit is disposed on the substrate, and
a power source chip that makes up the power supply unit is disposed on the substrate.

13. A power supply device comprising:
a plurality of power sources, each including an antenna and an AC/DC (Alternating Current/Direct Current) conversion circuit that converts an AC signal received by the antenna to a DC signal;
a plurality of first consolidating circuits, to which a plurality of DC signals are supplied from the plurality of power sources, each of the first consolidating circuits including a plurality of first switches connected between the plurality of power sources and a first output node of each one of the first consolidating circuits; and
a second consolidating circuit and a first voltage conversion circuit that converts a DC signal resulting from consolidation in the second consolidating circuit, to a predetermined voltage,
wherein the second consolidating circuit is supplied with the DC signals output from the first output nodes of the first consolidating circuits, and the second consolidating circuit includes a plurality of second switches connected between the plurality of first output nodes and a second output node.

14. The power supply device according to claim 13, wherein
each of the first consolidating circuits includes:
a second voltage conversion circuit that converts a DC signal resulting from consolidation in the first consolidating circuit, to a predetermined voltage; and
a first control circuit, to which power is supplied from the second voltage conversion circuit, the first control circuit controlling the first consolidating circuit, and
a second control circuit, to which power is supplied from the first voltage conversion circuit, the second control circuit controlling the second consolidating circuit.

15. The power supply device according to claim 14, further comprising:
a plurality of first monitoring circuits, each of which monitors the plurality of DC signals supplied by the plurality of power sources, and
the first control circuit controls the first consolidating circuit in accordance with a monitoring result in one of the first monitoring circuits.

16. The power supply device according to claim 14, further comprising a second monitoring circuit that monitors the plurality of DC signals output from the plurality of first consolidating circuits, and wherein the second control circuit controls the second consolidating circuit in accordance with a monitoring result in the second monitoring circuit.

17. The power supply device according to claim 13, wherein one of the first switches connects at least one of the plurality of power sources and the first output node, when voltage of the DC signal supplied by the at least one of the power sources is equal to or greater than a first threshold value, and one of the first switches connects the at least one of power source and a third output node, when voltage of the DC signal supplied by the at least one of the power sources is less than the first threshold value.

* * * * *